(12) United States Patent
Lim et al.

(10) Patent No.: US 11,107,253 B2
(45) Date of Patent: Aug. 31, 2021

(54) IMAGE PROCESSING METHOD, AND IMAGE DECODING AND ENCODING METHOD USING SAME

(71) Applicant: KAONMEDIA CO., LTD., Seongnam-si (KR)

(72) Inventors: Jeong Yun Lim, Seoul (KR); Hoa Sub Lim, Seongnam-si (KR)

(73) Assignee: KAONMEDIA CO., LTD., Seongnam-si (KR)

( * ) Notice: Subject to any disclaimer, the term of this patent is extended or adjusted under 35 U.S.C. 154(b) by 189 days.

(21) Appl. No.: 16/341,753

(22) PCT Filed: Oct. 12, 2017

(86) PCT No.: PCT/KR2017/011261
§ 371 (c)(1),
(2) Date: Apr. 12, 2019

(87) PCT Pub. No.: WO2018/070809
PCT Pub. Date: Apr. 19, 2018

(65) Prior Publication Data
US 2020/0051288 A1 Feb. 13, 2020

(30) Foreign Application Priority Data
Oct. 12, 2016 (KR) .................. 10-2016-0132038

(51) Int. Cl.
*G06T 9/40* (2006.01)
*H04N 19/105* (2014.01)
(Continued)

(52) U.S. Cl.
CPC ............... *G06T 9/40* (2013.01); *G06T 9/004* (2013.01); *H04N 19/105* (2014.11);
(Continued)

(58) Field of Classification Search
None
See application file for complete search history.

(56) References Cited

U.S. PATENT DOCUMENTS 8,111,756 B2 * 2/2012 Guo ............... H04N 19/176
375/240.24
9,807,412 B2 * 10/2017 Kim ............... H04N 19/513
(Continued)

FOREIGN PATENT DOCUMENTS

KR 10-0739714 B1 7/2007
KR 10-1585565 B1 1/2016
(Continued)

*Primary Examiner* — Anand P Bhatnagar
(74) *Attorney, Agent, or Firm* — Novick, Kim & Lee, PLLC; Sang Ho Lee; Hyun Woo Shin

(57) ABSTRACT

Provided are an image processing method, the method includes the steps of dividing a picture of an image into a plurality of coding units which are basic units in which an inter prediction or an intra prediction is performed; and selectively configuring a prediction mode list for deriving a prediction direction of the decoding target block from an intra prediction direction of an decoding target object from an intra prediction direction of a neighboring block adjacent to the decoding target object for an intra predicted unit among the divided coding units; wherein includes the picture or the divided coding units is/are divided into a binary tree structure in the step of dividing the coding units.

1 Claim, 21 Drawing Sheets

(51) Int. Cl.
*H04N 19/176* (2014.01)
*H04N 19/46* (2014.01)
*H04N 19/96* (2014.01)
*G06T 9/00* (2006.01)

(52) U.S. Cl.
CPC .......... *H04N 19/176* (2014.11); *H04N 19/46* (2014.11); *H04N 19/96* (2014.11); *G06T 2207/10016* (2013.01)

(56) References Cited

U.S. PATENT DOCUMENTS

| | | | |
|---|---|---|---|
| 10,397,569 B2 * | 8/2019 | Liu | H04N 19/11 |
| 10,397,598 B2 * | 8/2019 | Kim | H04N 19/593 |
| 10,412,385 B2 * | 9/2019 | Moriya | H04N 19/46 |
| 2008/0056355 A1 * | 3/2008 | Guo | H04N 19/176 375/240.12 |
| 2013/0028326 A1 * | 1/2013 | Moriya | H04N 19/107 375/240.16 |
| 2019/0306496 A1 * | 10/2019 | Moriya | H04N 19/46 |
| 2020/0021801 A1 * | 1/2020 | Jeong | H04N 19/105 |
| 2020/0036970 A1 * | 1/2020 | Yoo | H04N 19/82 |
| 2020/0288123 A1 * | 9/2020 | Kondo | H04N 19/186 |

FOREIGN PATENT DOCUMENTS

| | | | | |
|---|---|---|---|---|
| KR | 101585565 B1 * | 1/2016 | | H04N 19/70 |
| KR | 10-2016-0030323 A | 3/2016 | | |
| KR | 10-1633746 B1 | 6/2016 | | |
| KR | 1020160030323 | * 10/2018 | | H04N 19/50 |

* cited by examiner

| | Descriptor |
|---|---|
| coding_quadtree (x0, y0, log2Cbsize, cqtDepth){ | |
|   if(x0 + (1 << log2CbSize) <= pic_width_in_luma_samples && <br>    y0 + (1 << log2CbSize) <= pic_height_in_luma_samples && <br>    log2CbSize > MinCbLog2SizeY){ | |
|     *split_cu_flag[x0][y0]* | ae(v) |
|     *binary_split_flag[x0][y0]* | |
|     *binary_depth[x0][y0]* | |
|   } | |
|   ... | |
| *if(binary_split_flag[x0][y0]){* | |
| *Binary_split_mode // or Binary_split_ver, Binary_split_hor* | |
| *}* | |
| if(split_cy_flag[x0][y0]){ | |
|   x1 = x0 + (1 << (log2CbSize − 1)) | |
|   y1 = y0 + (1 << (log2CbSize − 1)) | |
|   *coding_quadtree* (x0, y0, log2CbSize − 1, cqtDepth+1) | |
|   if(x1 < pic_width_in_luma_samples) | |
|   *coding_quadtree* (x1, y0, log2CbSize − 1, cqtDepth +1) | |
|   if(y1 < pic_height_in_luma_samples) | |
|   *coding_quadtree* (x0, y1, log2CbSize − 1, cqtDepth + 1) | |
|   if(x1 < pic_width_in_luma_samples && y1 < pic_height_in_luma_sampels) | |
|   *coding_quadtree* (x1, y1, log2CbSize − 1, cqtDepth + 1) | |
| } else if (binary_depth == 0){ | |
|   *coding_unit* (x0, y0, log2CbSize) | |
| } else | |
|   *coding_binarytree* (x0, y0, log2Cbsize, cqtDepth, binary_depth <br>  /* Binary_split_flag*/) | |
| } | |

FIG. 10

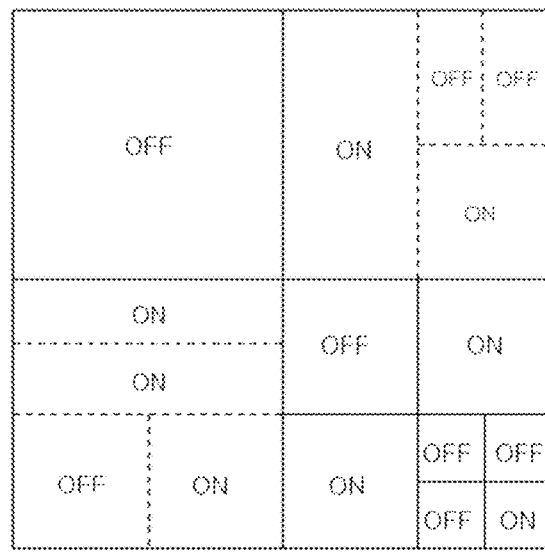
(a)
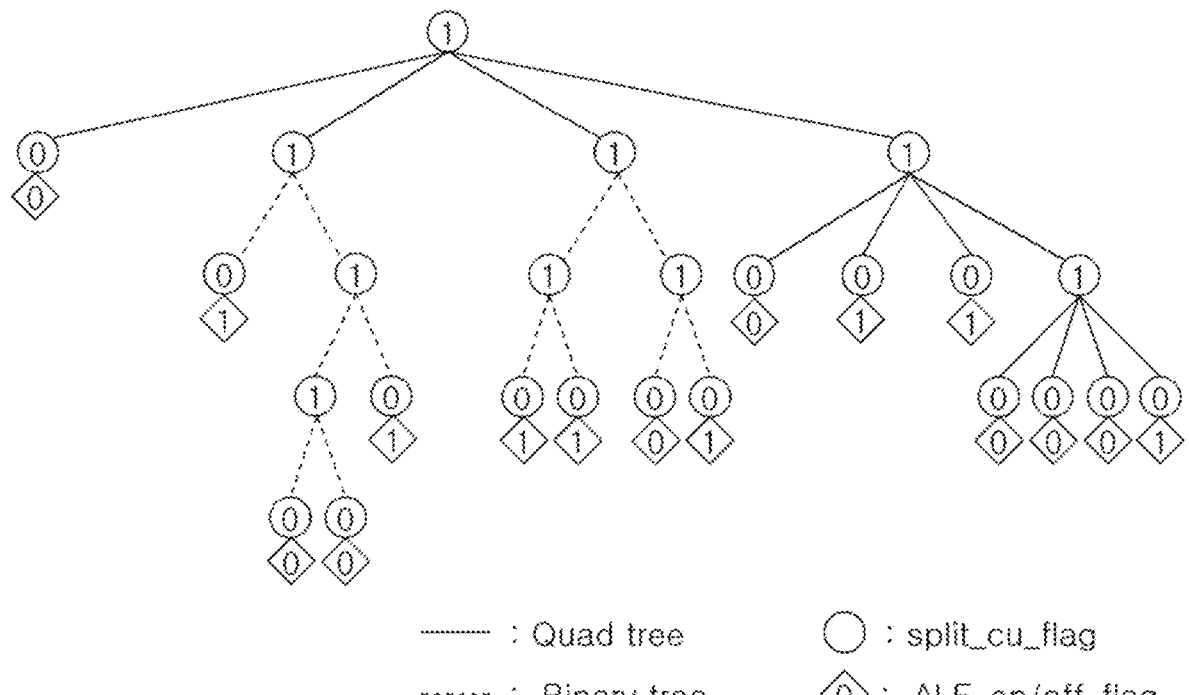
——— : Quad tree  ◯ : split_cu_flag
- - - - : Binary tree  ◇ : ALF_on/off_flag
(b)
FIG. 20

IMAGE PROCESSING METHOD, AND IMAGE DECODING AND ENCODING METHOD USING SAME

TECHNICAL FIELD

The present invention relates to image encoding and decoding techniques, and more particularly, to a method for performing intra prediction and conversion by dividing a moving picture into a plurality of blocks.

BACKGROUND ART

In the image compression method, a picture is divided into a plurality of blocks each having a predetermined size to perform encoding. In addition, inter prediction and intra prediction techniques for eliminating redundancy between pictures are used to increase compression efficiency.

In this case, intra prediction and inter prediction are used to generate a residual signal, the reason for obtaining the residual signal is to increase the compression ratio since the amount of data is small when coding is done with the residual signal, and the value of the residual signal may be small as the predictions become more accurate.

The intra prediction method predicts the data of the current block by using the pixels around the current block. At this case, the difference between the actual value and the predicted value is called a residual signal block. In case of HEVC, the intra prediction method increases to 35 prediction modes from nine prediction modes used in the existing H.264/AVC, and more subdivided prediction may be performed.

In case of the inter prediction method, the current block is compared with the blocks in neighboring pictures to find the most similar block. At this time, the position information (Vx, Vy) of the found block is referred to as a motion vector. Also, the difference of the pixel value within the block between the current block and the prediction block predicted by the motion vector is called a residual signal block.

As such, the intra prediction and the inter prediction are further subdivided, the amount of data in the residual signal is decreasing, but the amount of computation for video processing has increased greatly.

Particularly, there is a difficulty in pipeline implementation and the like, due to the increase in complexity in the process of determining a division structure in picture for image encoding and decoding, and the conventional block division method and the size of the divided blocks thereof may not be suitable for encoding a high-resolution image.

SUMMARY OF THE INVENTION

Technical Problem

The present invention has been made to solve the above problems, and it is an object of the present invention to provide an image processing method and a video decoding and encoding method using the same, which is suitable for encoding and decoding a high-resolution image,

Technical Solution

According to an aspect of the present invention, there is provided an image processing method comprises: dividing a picture of an image into a plurality of coding units which are basic units in which an inter prediction or an intra prediction is performed; and selectively configuring a prediction mode list for deriving a prediction direction of the decoding target block from an intra prediction direction of an decoding target object from an intra prediction direction of a neighboring block adjacent to the decoding target object for an intra predicted unit among the divided coding units; wherein includes the picture or the divided coding units is/are divided into a binary tree structure in the step of dividing the coding units.

According to the other aspect of the present invention, there is provided an image processing method comprises: receiving an encoded bit stream; performing inverse quantization and inverse transform on the input bit stream and obtaining a residual block; obtaining a prediction block by performing an inter prediction or an intra prediction; reconstructing an image by summing the obtained residual block and a prediction block; and performing adaptive loop filtering by each coding unit for the reconstructed image; wherein a coding unit, which is a basic unit in which an inter prediction or an intra prediction is performed, is a block divided from a coding tree unit using a binary tree structure, and a prediction mode list for deriving a prediction direction of the decoding target block from an intra prediction direction of a neighboring block adjacent to the decoding target block is selectively configured for an intra predicted unit of the divided coding units in the step of obtaining the prediction block.

Meanwhile, the above-described methods may be embodied as a computer-readable recording medium on which a program for execution by a computer is recorded.

Advantageous Effects

According to an embodiment of the present invention, the coding efficiency for the high resolution image can be improved by dividing a coding unit which is a basic unit in which inter prediction or intra prediction is performed into a binary tree structure, and configuring a prediction mode list for intra prediction from neighboring blocks to the divided coding units.

BRIEF DESCRIPTION OF DRAWINGS

FIG. 10 is a diagram showing an embodiment of a syntax structure used for dividing and processing an image into a plurality of block units.

FIG. 20 is a diagram for explaining a block-based adaptive loop filtering method according to a second embodiment of the present invention.

DETAILED DESCRIPTION OF THE INVENTION

Hereinafter, embodiments of the present invention will be described in detail with reference to the drawings. In the following description of the embodiments of the present invention, a detailed description of known functions and configurations incorporated herein will be omitted when it may make the subject matter of the present disclosure rather unclear It is to be understood that when an element is referred to as being "connected" or "connected" to another element, it may be directly connected or connected to the other element. In addition, the description of a specific configuration in the present invention does not exclude a configuration other than the configuration, and means that additional configurations can be included in the scope of the present invention or the scope of the present invention.

The terms first, second, etc. may be used to describe various elements, but the elements should not be limited by the terms. The terms are used only for the purpose of distinguishing one component from another. For example, without departing from the scope of the present invention, the first component may be referred to as a second component, and similarly, the second component may also be referred to as a first component.

In addition, the components shown in the embodiments of the present invention are shown independently to represent different characteristic functions, which do not mean that each component is composed of separate hardware or software constituent units. That is, each constituent unit is included in each constituent unit for convenience of explanation, and at least two constituent units of the constituent units may be combined to form one constituent unit, or one constituent unit may be divided into a plurality of constituent units to perform a function. The integrated embodiments and the separate embodiments of the components are also included within the scope of the present invention, unless they depart from the essence of the present invention.

In addition, some of the elements are not essential elements for performing essential functions in the present invention, but may be optional elements for improving performance. The present invention can be implemented only with components essential for realizing the essence of the present invention except for the components used for performance enhancement, and can be implemented with only the essential components except for optional components used for performance improvement Are also included in the scope of the present invention.

Figure 1:
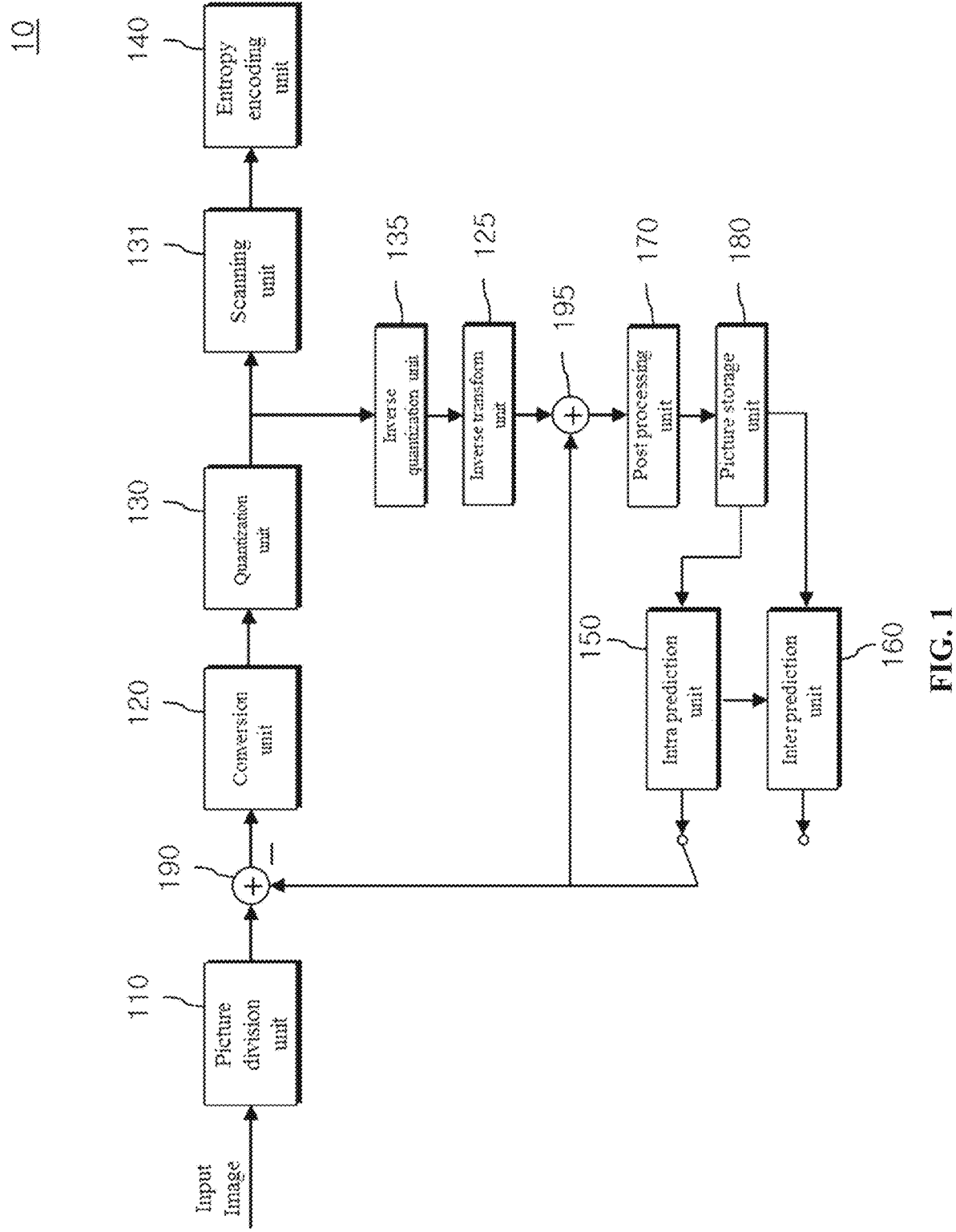
FIG. 1 is a block diagram illustrating a configuration of an image encoding apparatus according to an embodiment of the present invention.

FIG. 1 is a block diagram illustrating a configuration of an image encoding apparatus according to an exemplary embodiment of the present invention. The image encoding apparatus 10 includes a picture division unit 110, a conversion unit 120, a quantization unit 130, a scanning unit 131, an entropy encoding unit 140, an intra prediction unit a prediction unit 150, an inter prediction unit 160, an inverse quantization unit 135, an inverse transform unit 125, a post processing unit 170, a picture storage unit 180, a subtraction unit 190, and an adder 195.

Referring to FIG. 1, the picture division unit 110 analyzes an input video signal, divides a picture into a plurality of coding units to determine a prediction mode, and determines a size of a prediction unit for each coding unit.

The picture division unit 110 forwards an encoding target prediction unit to the intra prediction unit 150 or the inter prediction unit 160 according to the prediction mode (or a prediction method). The picture division unit 110 also forwards the encoding target prediction unit to the subtraction unit 190.

Here, the picture of the image is composed of a plurality of slices, and the slice may be divided into a plurality of coding tree units CTU, which is a basic unit for dividing the picture.

The coding tree unit may be divided into one or two or more coding units CUs, which are basic units for performing the inter prediction or the intra prediction.

The coding unit CU may be divided into one or more prediction units PU, which are basic units on which prediction is performed.

In this case, the coding apparatus 10 determines one of the inter prediction and the intra prediction as a prediction method for each of the divided coding units CUs, but it is differently generated for each prediction unit PU.

On the other hand, the coding unit CU may be divided into one or two or more transform units TUs, which are basic units in which a conversion for a residual block is performed.

In this case, the picture division unit 110 may forward the image data to the subtraction unit 190 through the divided block unit (for example, the prediction unit PU or the conversion unit TU 190).

Figures 2, 3:
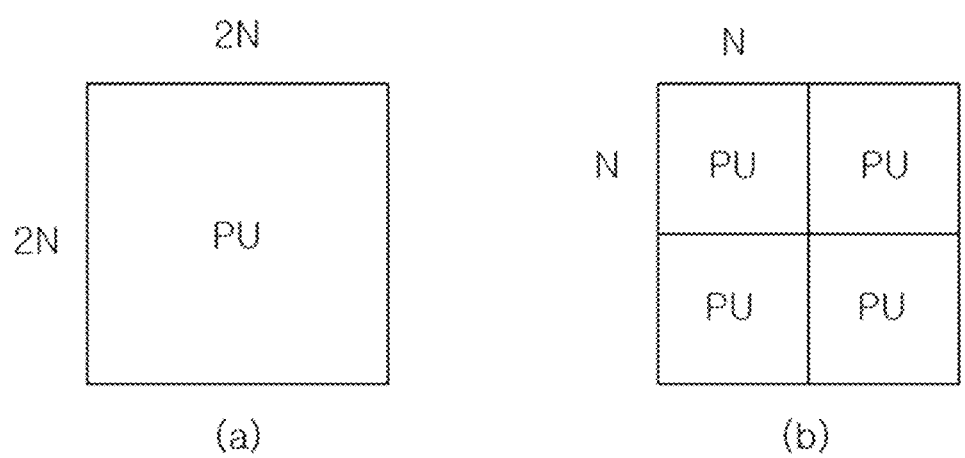
FIGS. 2 to 5 are views for explaining a first embodiment of a method of dividing and processing an image into a plurality of block units.

Referring to FIG. 2, the coding tree unit CTU having a maximum size of 256×256 pixels is divided into a quad tree structure and then divided into four coding units CUs having a square shape.

Each of the four coding units CUs having the square shape can be divided into a quad tree structure, and the depth of the coding unit CU divided into the quad tree structure may have an integer value from 0 to 3.

The coding unit CU may be divided into one or more prediction units PU according to the prediction mode.

In the case of the intra prediction mode, when the size of the coding unit CU is 2N×2N, the prediction unit PU can have the size of 2N×2N shown in FIG. 3A or the size of N×N shown in FIG. 3B.

On the other hand, in the case of the inter prediction mode, when the size of the coding unit CU is 2N×2N, the prediction unit PU can have any of among 2N×2N shown in FIG. 4A, 2N×N shown in FIG. 4B, N×2N shown in FIG. 4C, N×N shown in FIG. 4D, 2N×nU shown in FIG. 4E, 2N×nD shown in FIG. 4F, and nL×2N shown in FIG. 4G, and nR×2N shown in FIG. 4H.

Figure 5:
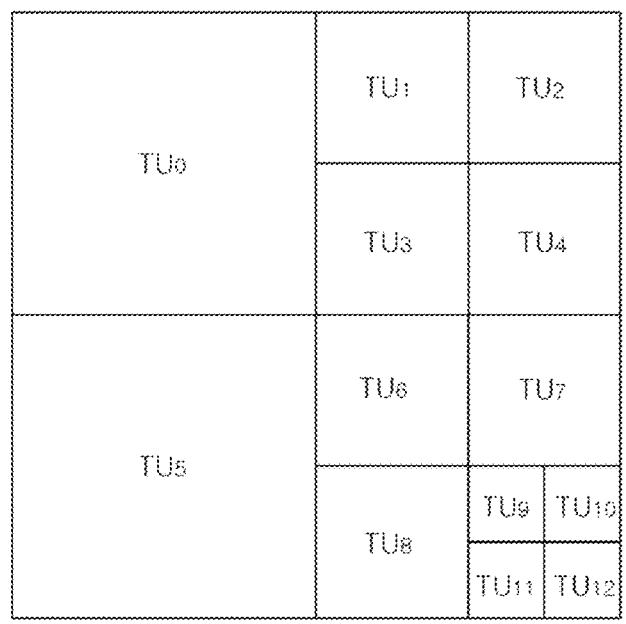

Referring to FIG. 5, the coding unit CU is divided into the quad tree structure, and then can be divided into four conversion units Tus having the form of a square.

The four transformation units TU having the square shape can be subdivided into a quad tree structure, respectively, and the depth of the transform unit TU divided into the quad tree structure may have any one of an integer value from 0 to 3.

Here, when the coding unit CU is the inter prediction mode, the prediction unit PU and the conversion unit TU that are divided from the coding unit CU may have a division structure that is independent of each other.

When the coding unit CU is the intra prediction mode, the conversion unit TU divided from the coding unit CU may not be larger than the size of the prediction unit PU.

In addition, the conversion unit TU divided as described above can have maximum size of 64×64 pixels.

The conversion unit 120 converts an original block of the input prediction unit PU and the intra prediction unit 150 or a residual block, which is a residual signal between the prediction blocks generated in the inter prediction unit 160, and the conversion may be performed with the conversion unit TU as a basic unit.

In the conversion process, different conversion matrices may be determined according to the prediction mode (intra or inter), since the residual signal of the intra prediction has directionality according to the intra prediction mode, the transformation matrix may be adaptively determined according to the intra prediction mode.

The transformation unit can be transformed by a one-dimensional transformation matrix of two (horizontal, vertical), for example, in the case of the inter prediction, a predetermined conversion matrix may be determined.

On the other hand, in the case of the intra prediction, when the intra prediction mode is horizontal, the probability that the residual block has directionality in the vertical direction becomes high, a DCT-based integer matrix is applied in the vertical direction, and a DST-based or KLT-based integer matrix is applied in the horizontal direction. While the intra prediction mode is vertical, the DST-based or KLT-based integer matrix may be applied in the vertical direction and the DCT-based integer matrix may be applied in the horizontal direction.

In the case of the DC mode, the DCT-based integer matrix can be applied to both directions.

And, in the case of the intra prediction, the transformation matrix may be adaptively determined based on the size of the transformation unit TU.

The quantization unit 130 determines a quantization step size for quantizing the coefficients of the residual block transformed by the transform matrix, the quantization step size may be determined for each quantization unit larger than a predetermined size.

The size of the quantization unit may be 8×8 or 16×16, and the quantization unit 130 quantizes the coefficients of the transform block using the quantization matrix determined according to the quantization step size and the prediction mode.

Also, the quantization unit 130 may use the quantization step size of the quantization unit adjacent to the current quantization unit as the quantization step size predictor of the current quantization unit.

The quantization unit 130 searches the left quantization unit, the top quantization unit, and the top left quantization unit of the current quantization unit in order, and generates the quantization step size predictor of the current quantization unit using one or two valid quantization step sizes.

For example, the quantization unit 130 may determine the valid first quantization step size searched in the above order as a quantization step size predictor, or determine an average value of two effective quantization step sizes searched in the above order as the quantization step size predictor, or when only one quantization step size is valid, it may be determined as the quantization step size predictor.

When the quantization step size predictor is determined, the quantization unit 130 transmits the difference value between the quantization step size of the current quantization unit and the quantization step size predictor to the entropy encoding unit 140.

On the other hand, neither the left coding unit, the top coding unit, the top left coding unit of the current coding unit exists, or there may be a coding unit that was previously present on the coding order within the maximum coding unit.

Therefore, the quantization step sizes of the quantization units immediately before the coding order within the quantization unit adjacent to the current coding unit and the maximum coding unit may be candidates.

In this case, the priority may be set by following order (1) the left quantization unit of the current coding unit, (2) the top quantization unit of the current coding unit, (3) the top left side quantization unit of the current coding unit, and (4) a quantization unit immediately before the encoding order. The above order may be changed, and the top left side quantization unit may be omitted.

Meanwhile, the quantized transform block is transferred to the inverse quantization unit 135 and the scanning unit 131.

The scanning unit 131 scans the coefficients of the quantized transform block to convert the coefficients into one-dimensional quantization coefficients. In this case, since the coefficient distribution of the transform block after quantization may be dependent on the intra prediction mode, the scanning method may be determined according to the intra prediction mode.

The coefficient scanning method may be determined depending on the size of the conversion unit, the scan pattern may be varied according to the directional intra prediction mode. In this case, the scan order of the quantization coefficients may be scanned in the reverse direction.

If the quantized coefficients are divided into a plurality of sub-sets, the same scan pattern may be applied to the quantization coefficients within each sub-set, the scan pattern between sub-set may be applied to zigzag scan or diagonal scan.

Meanwhile, the scan pattern is preferably scanned from the main sub-set including the DC to the remaining sub-sets in the forward direction, but the reverse direction is also available.

It is also possible to set the scan pattern between the sub-sets in the same manner as the scan pattern of the quantized coefficients within the sub-sets, the scan pattern between the sub-sets may be determined according to the intra prediction mode.

On the other hand, the encoding apparatus 10 transforms to the decoding device 20 the bit stream including information which may indicate the position of the last non-zero quantization coefficient in the conversion unit PU and the position of the last non-zero quantization coefficient in each sub-set.

The inverse quantization unit 135 dequantizes the quantization coefficients quantized as described above, the inverse transform unit 125 performs the inverse transform by a transform unit TU basis, so that the dequantized transform coefficients are reconstructed into the residual blocks of the spatial region.

The adder 195 adds the residual block reconstructed by the inverse transform unit 125 and the prediction block received from the intra prediction unit 150 or the inter prediction unit 160 to generate a reconstruction block.

In addition, the post processing unit 170 performs (1) a deblocking filtering process for removing the blocking effect generated in the restored picture, (2) a sample adaptive offset (SAO) application process for compensating the difference value with respect to the original image in units of pixels, and (3) an adaptive loop filtering ALF process for compensating the difference value with the original image by the coding unit.

The deblocking filtering process can be applied to a boundary of the prediction unit PU or the conversion unit TU having a size larger than a predetermined size.

For example, the deblocking filtering process includes the steps of determining a boundary to be filtered, determining a boundary filtering strength to apply to the boundary, determining whether a deblocking filter is applied, and selecting a filter to be applied to the boundary when it is determined to apply the deblocking filter.

Meanwhile, whether or not the deblocking filter is applied may be determined by (i) whether the boundary filtering strength is greater than zero, and (ii) whether the value, indicating the degree of change of the pixel values at the boundary of two blocks (P block, Q block) adjacent to the boundary to be filtered, is smaller than the first reference value determined by the quantization parameter.

The filter is preferably at least two. If the absolute value of the difference value between two pixels located at the block boundary is greater than or equal to the second reference value, a filter that performs relatively weak filtering is selected.

The second reference value is determined by the quantization parameter and the boundary filtering strength.

In addition, an application process of sample adaptive offset SAO is intended to reduce a distortion between a pixel in an image to which the deblocking filter is applied and a source pixel, it may be determined that whether to perform the sample adaptive offset SAO application process in picture or slice units.

The picture or slice may be divided into a plurality of offset regions, an offset type may be determined for each offset region, and the offset type may include an edge offset types of a predetermined number (for example, four) and two band offset types.

For example, if the offset type is the edge offset type, it is determined an edge type to which each pixel belongs and applies a corresponding offset thereto, the edge type can be determined based on the distribution of two pixel values adjacent to the current pixel.

The adaptive loop filtering ALF process can perform a filtering on the basis of a value obtained by comparing an image reconstructed through the deblocking filtering process or the adaptive offset applying process and an original image.

The picture storage unit 180 receives the post-processed image data from the post processing unit 170, reconstructs and restores the pictures in an unit of picture, the picture may be a frame-based image or a field-based image.

The inter prediction unit 160 performs the motion estimation using at least one reference picture stored in the picture storage unit 180, and the reference picture index indicating the reference picture and the motion vector can be determined.

In this case, depending on the determined reference picture index and motion vector, a prediction block corresponding to the prediction unit to be coded can be extracted from the reference picture used for the motion estimation among a plurality of reference pictures stored in the picture storage unit 180.

The intra prediction unit 150 may perform the intra prediction encoding using the reconstructed pixel values inside the picture including the current prediction unit.

The intra prediction unit 150 receives the current prediction unit to be predictively encoded and performs the intra prediction by selecting one of a predetermined number of intra prediction modes according to the size of the current block.

The intra prediction unit 150 adaptively filters the reference pixels to generate the intra prediction blocks, if the reference pixels are not available, the reference pixels may be generated using available reference pixels.

The entropy encoding unit 140 may entropy-encode a quantization coefficient quantized by a quantization unit 130, the intra prediction information received from the intra prediction unit 150, the motion information received from the inter prediction unit 160, and the like.

Figure 6:
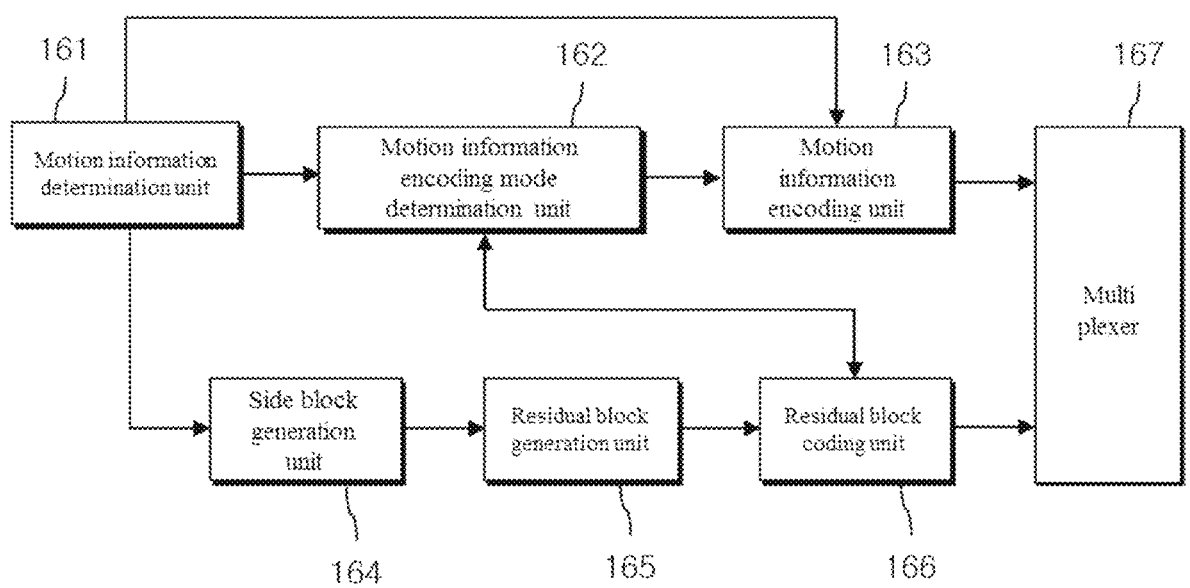
FIG. 6 is a block diagram illustrating an embodiment of a method for performing inter prediction in an image encoding apparatus.

FIG. 6 is a block diagram of an embodiment of a configuration for performing the inter prediction in the encoder 10. The inter prediction encoder includes a motion information determination unit 161, a motion information encoding mode determination unit 162, a motion information encoding unit 163, a side block generation unit 164, a residual block generation unit 165, a residual block coding unit 166, and a multiplexer 167.

Referring to FIG. 6, the motion information determination unit 161 determines the motion information of the current block, the motion information includes the reference picture index and the motion vector, the reference picture index may indicate any one of pictures that have been previously encoded and reconstructed.

When the current block is unidirectionally inter predictive coded, the current block indicates one of the reference pictures belonging to the list 0 (L0), while when the current block is bi-directionally predictive coded, the current block includes a reference picture index indicating one of the reference pictures of the list 0 (L0) and a reference picture index indicating one of the reference pictures of the list 1 (L1).

In addition, when the current block is bi-directionally predictive-coded, it may include an index indicating one or two pictures among the reference pictures of the composite list LC generated by combining the list 0 and the list 1.

The motion vector indicates the position of the prediction block in the picture where each reference picture index is indicated, the motion vector may be a pixel unit (integer unit) or a sub-pixel unit.

For example, the motion vector may have a resolution of ½, ¼, ⅛ or ¹⁄₁₆ pixels, if the motion vector is not an integer unit, the prediction block can be generated from the pixels of integer units.

The motion information encoding mode determination unit 162 may determine a coding mode for the motion information of the current block as one of a skip mode, a merge mode, and an AMVP mode.

In the skip mode, there is a skip candidate having the same motion information as the motion information of the current block to apply when the residual signal is zero, the skip mode can be applied when the current block which is the prediction unit PU is the same size as the coding unit CU.

The merge mode is applied when there is a merge candidate having the same motion information as the current block motion information, and the current block is different in size from the coding unit CU, but when the current block and the coding unit CU are the same, the merge mode is applied and there is a residual signal. On the other hand, the merge candidate and the skip candidate may be the same.

AMVP mode is applied when the skip mode and the merge mode are not applied, the AMVP candidate having the motion vector most similar to the motion vector of the current block can be selected as an AMVP predictor.

The motion information encoding unit 163 may the encode motion information according to a method determined by the motion information encoding mode determination unit 162.

For example, when the motion information encoding mode is the skip mode or the merge mode, the motion information encoding unit 163 performs a merge motion vector encoding process, in an AMVP mode, the AMVP encoding process can be performed.

The side block generation unit 164 generates the prediction block using the motion information of the current block, if the motion vector is an integer unit, the block corresponding to the position indicated by the motion vector in the picture indicated by the reference picture index is copied to generate the prediction block of the current block.

On the other hand, when the motion vector is not an integer unit, the side block generation unit 164 can generate the pixels of the prediction block from the pixels in the integer unit in the picture where the reference picture index is indicated.

In this case, a prediction pixel is generated using an 8-tap interpolation filter for the luminance pixel, for a chrominance pixel, the predictive pixel can be generated using a 4-tap interpolation filter.

The residual block generation unit 165 generates the residual block using the current block and the prediction block of the current block, if the size of the current block is 2N×2N, the residual block can be generated using the 2N×2N prediction block corresponding to the current block and the current block.

On the other hand, when the size of the current block used for prediction is 2N×N or N×2N, after obtaining the prediction block for each of the two 2N×N blocks constituting 2N×2N, the prediction block for each of the 2N×N blocks constituting 2N×2N is obtained, the final prediction block of 2N×2N size can be generated using the two 2N×N prediction blocks.

Also, a 2N×2N residual block may be generated using the 2N×2N prediction block,

Overlap smoothing may be applied to the pixels of the boundary portion to resolve the discontinuity of the boundary portion of the two prediction blocks having the size of 2N×N.

The residual block coding unit 166 divides the residual block into one or more conversion units (TUs). Each transform unit TU can be transcoded, quantization encoded, and entropy encoded.

The residual block coding unit 166 can transform the residual block generated by the inter prediction method using an integer-based transform matrix, the transform matrix may be an integer-based DCT matrix.

Meanwhile, the residual block coding unit 166 uses a quantization matrix to quantize the coefficients of the residual block transformed by the transform matrix, the quantization matrix may be determined by a quantization parameter.

Wherein the quantization parameter is determined for each coding unit CU of a predetermined size or larger, if the current coding unit CU is smaller than the predetermined size, only the quantization parameter of the first coding unit CU in the coding order among the coding units CU within the predetermined size is encoded, and the quantization parameters of the remaining coding units CU may not be encoded, since the quantization parameters are the same as the above parameters.

In addition, the coefficients of the transform block may be quantized using a quantization matrix determined according to the quantization parameter and the prediction mode.

The quantization parameter determined for each coding unit CU larger than the predetermined size can be predictively encoded using the quantization parameter of the coding unit CU adjacent to the current coding unit CU.

The quantization parameter predictor of the current coding unit CU can be generated by searching in the order of the left coding unit CU, the top coding unit CU of the current coding unit CU and using one or two valid quantization parameters.

For example, the valid first quantization parameter searched in the above order may be determined as the quantization parameter predictor, the valid first quantization parameter can be determined as the quantization parameter predictor by searching in the order of the left coding unit CU and the coding unit CU immediately before the coding order.

The coefficients of the quantized transform block are scanned and converted into one-dimensional quantization coefficients, the scanning method can be set differently according to the entropy encoding mode.

For example, when encoded with CABAC, the inter prediction encoded quantized coefficients can be scanned in one predetermined manner (zigzag, or raster scan in diagonal direction), when the coefficients is encoded by CAVLC, it can be scanned in a different manner from the above method.

For example, in the case of the inter scanning method, it may be determined by the zigzag method, while in the case of intra, it may be determined according to the intra prediction mode, the coefficient scanning method may be determined differently depending on the size of the conversion unit.

Meanwhile, the scan pattern may vary according to the directional intra prediction mode, the scan order of the quantization coefficients may be scanned in the reverse direction.

The multiplexer 167 multiplexes the motion information encoded by the motion information encoding unit 163 and the residual signals coded by the residual block coding unit 166.

The motion information may vary according to the encoding mode, for example, in the case of skipping or merge, only the index indicating the predictor is included, while in case of AMVP, it may include the reference picture index of the current block, the differential motion vector, and an AMVP index.

Hereinafter, the embodiment of the operation of the intra prediction unit 150 shown in FIG. 1 will be described in detail.

First, the intra prediction unit 150 receives the prediction mode information and the size of the prediction unit PU from the picture division unit 110, the reference pixel may be read from the picture storage unit 180 to determine the intra prediction mode of the prediction unit PU.

The intra prediction unit 150 determines whether the reference pixel is generated by examining whether or not a reference pixel which is not available exists, the reference pixels may be used to determine the intra prediction mode of the current block.

When the current block is located at the top boundary of the current picture, pixels adjacent to the top side of the current block are not defined, when the current block is located at the left boundary of the current picture, pixels adjacent to the left side of the current block are not defined, then it can be determined that the pixels are not usable pixels.

Also, even if the current block is located at the slice boundary and the pixels adjacent to the top side or the left side of the slice are not firstly encoded and reconstructed, it can be determined that they are not usable pixels.

As described above, if there are no pixels adjacent to the left or top side of the current block, or there are no pixels which are previously encoded and reconstructed pixels, the intra prediction mode of the current block may be determined using only the available pixels.

On the other hand, a reference pixel at an unusable position may be generated using available reference pixels of the current block, for example, if the pixels of the top block are not available, the top pixels may be created using some or all of the left pixels, or if the pixels of the left block are not available, the left pixels may be created using some or all of the top pixels.

That is, the reference pixel is generated by copying the available reference pixel at a position nearest to a predetermined direction from a reference pixel at an unavailable position, or if there is no reference pixel available in the predetermined direction, the reference pixel can be generated by copying the available reference pixel in the nearest position in the opposite direction.

On the other hand, even if the top or left pixels of the current block exist, the reference pixel may be determined as a non-available reference pixel according to the coding mode of the block to which the pixels belong.

For example, when the block, to which the reference pixel adjacent to the top side of the current block belongs, is inter-coded and reconstructed, the pixels can be determined as unavailable pixels.

In this case, available reference pixels may be generated using pixels belonging to the block obtained by intra-coding the block adjacent to the current block, information that the encoding device 10 determines the usable reference pixel in accordance with the encoding mode is transferred to the decoding device 20.

The intra prediction unit 150 determines the intra prediction mode of the current block using the reference pixels, the number of intra prediction modes, that can be accepted in the current block, may vary depending on the size of the block.

For example, if the current block size is 8×8, 16×16, or 32×32, there may be 34 intra prediction modes, while if the current block size is 4×4, there may be 17 intra prediction modes.

The 34 or 17 intra prediction modes may be composed of at least one non-directional mode and a plurality of directional mode.

The one or more non-directional modes may be a DC mode and/or a planar mode. When the DC mode and the planar mode are included in the non-directional mode, there may be 35 intra prediction modes regardless of the size of the current block.

In this case, two non-directional modes (DC mode and planar mode) and 33 directional modes may be included.

In the planar mode, the prediction block of the current block is generated using at least one pixel value (or a predicted value of the pixel value, hereinafter referred to as a first reference value) located at the bottom-right of the current block and the reference pixels, respectively.

The configuration of the decoding device according to an embodiment of the present invention can be derived from the configuration of the image encoding apparatus 10 described with reference to FIGS. 1 to 6. For example, the image can be decoded by reversely performing the processes of the image encoding method as described with reference to FIGS. 1 to 6.

Figure 7:
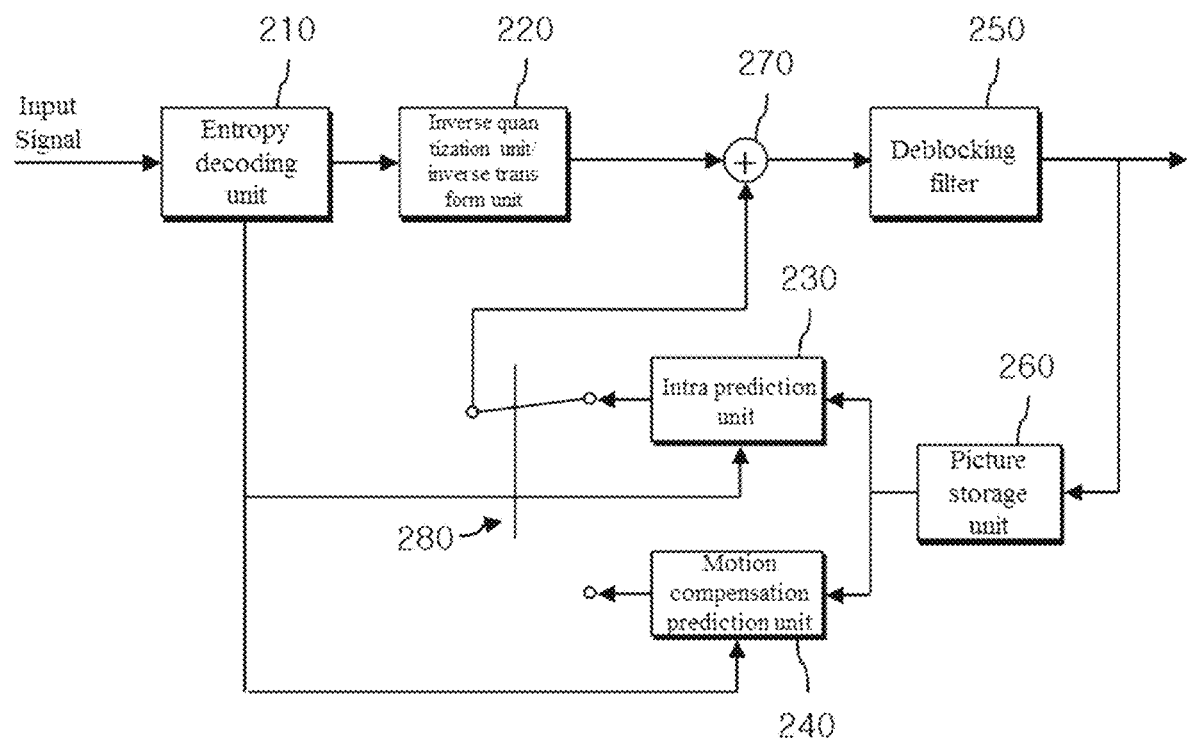
FIG. 7 is a block diagram illustrating a configuration of an image decoding device according to an embodiment of the present invention.

FIG. 7 is a block diagram illustrating a configuration of the decoding device according to an exemplary embodiment of the present invention, the decoding device 20 includes an entropy decoding unit 210, an inverse quantization/inverse transform unit 220, an adder 270, a deblocking unit 270, a deblocking filter 250, a picture storage unit 260, an intra prediction unit 230, a motion compensation prediction unit 240, and an intra/inter changing switch 280.

The entropy decoding unit 210 receives and decodes a bitstream encoded from the image encoding apparatus 10, separates the encoded bitstream into an intra prediction mode index, motion information, a quantization coefficient sequence, and transmits the decoded motion information to the motion compensation prediction unit 240.

The entropy decoding unit 210 transmits the intra prediction mode index to the intra prediction unit 230 and the inverse quantization/inverse transform unit 220, and transfers the inverse quantization coefficient sequence to the inverse quantization/inverse transform unit 220.

The inverse quantization/inverse transform unit 220 converts the quantization coefficient sequence into a two-dimensional inverse quantization coefficient, and for example, one of a plurality of scanning patterns can be selected for the conversion and the scanning pattern can be selected based on the prediction mode of the current block (i.e., intra prediction or inter prediction) and the intra prediction mode.

The inverse quantization/inverse transform unit 220 applies the quantization matrices selected from a plurality of quantization matrices to the inverse quantization coefficients of the two-dimensional array to reconstruct the quantization coefficients.

Meanwhile, different quantization matrices are applied depending on the size of the current block to be reconstructed, the quantization matrix may be selected based on at least one of the prediction mode and the intra prediction mode of the current block for a block of the same size.

The inverse quantization/inverse transform unit 220 reconstructs the residual block by inversely transforming the reconstructed quantization coefficient, the inverse conversion process may be performed with the conversion unit TU as a basic unit.

The adder 270 adds the residual block reconstructed by the inverse quantization/inverse transform unit 220 on the prediction blocks generated by the intra prediction unit 230 or the motion compensation prediction unit 240.

The deblocking filter 250 performs deblocking filter process on the reconstructed image generated by the adder 270, and reduces the deblocking artifact due to the video loss from the quantization process.

The picture storage unit 260 is a frame memory for storing a local decoded image performed to the deblocking filter process by the deblocking filter 250.

The intra prediction unit 230 reconstructs the intra prediction mode of the current block based on the intra prediction mode index received from the entropy decoding unit 210, and generates a prediction block according to the reconstructed intra prediction mode.

The motion compensation prediction unit 240 generates the prediction block for the current block from the picture stored in the picture storage unit 260 based on the motion vector information, and generates the prediction block by applying a selected interpolation filter, when the motion compensation with small number of precision is applied.

The intra/inter changing switch 280 provides the prediction block generated in one of the intra prediction unit 230 and the motion compensation prediction unit 240 based on the encoding mode to the adder 270.

Figure 8:
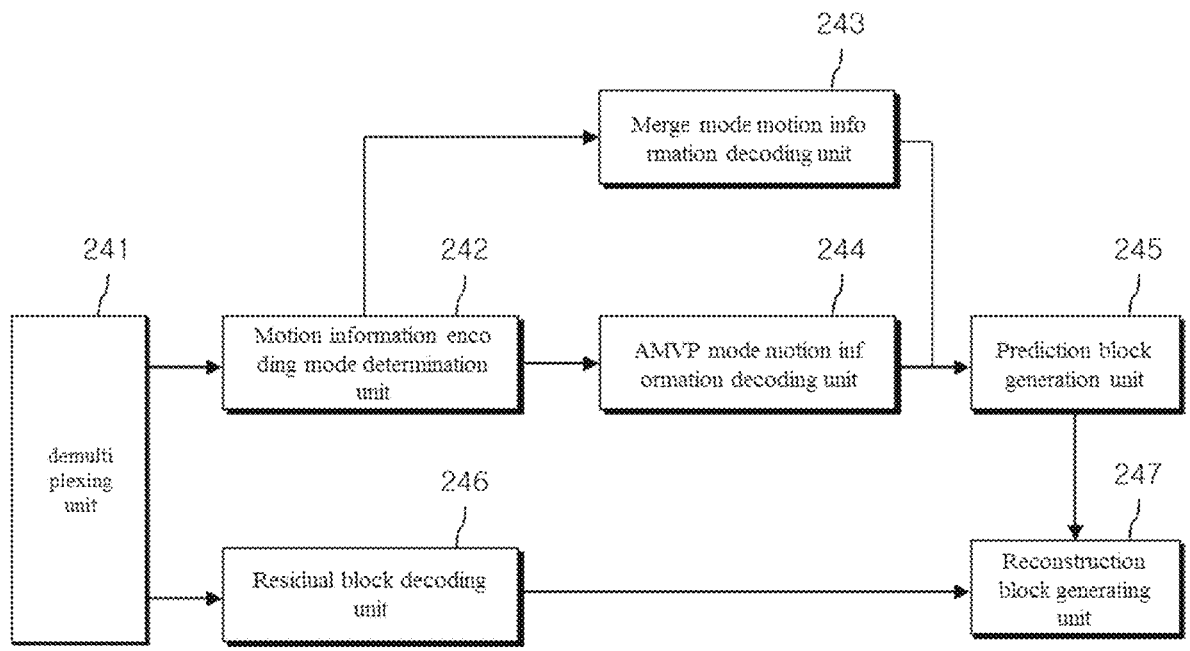
FIG. 8 is a block diagram for explaining an embodiment of a method of performing inter prediction in an image decoding device.

FIG. 8 is a block diagram of an embodiment of a configuration for performing inter prediction in the decoding device 20, the inter prediction decoder includes an inter prediction decoder demultiplexing unit 241, a motion information encoding mode determination unit 242, a merge mode motion information decoding unit 243, an AMVP mode motion information decoding unit 244, a prediction block generation unit 245, a residual block decoding unit 246, and a reconstruction block generating unit 247.

Referring to FIG. 8, the demultiplexing unit 241 demultiplexes the currently encoded motion information and the encoded residual signals from the received bitstream, transmits the demultiplexed motion information to a motion information encoding mode determination unit 242, and transmits the demultiplexed residual signal to the residual block decoding unit 246.

The motion information encoding mode determination unit 242 determines the motion information encoding mode of the current block, if the skip_flag of the received bit stream has a value of 1, it can be determined that the motion information encoding mode of the current block is coded in the skip encoding mode.

The motion information encoding mode determination unit 242 determines that it can be determined that the motion information encoding mode of the current block is encoded in the merge mode, the skip_flag of the received bitstream has a value of 0, and the motion information received from the demultiplexing unit 241 has merge indices only.

Also, the motion information encoding mode determination unit 242 determines that the motion information encoding mode of the current block is coded in the AMVP mode when the skip_flag of the received bitstream has a value of 0, the motion information received from the demultiplexing unit 241 has a reference picture index, a differential motion vector, and an AMVP index.

The merge mode motion information decoding unit 243 may not be activated when the motion information encoding mode determination unit 242 determines that the motion information encoding mode of the current block is skipped or merge mode, the AMVP mode motion information decoding unit 244 may be activated when the motion information encoding mode determination unit 242 determines that the motion information encoding mode of the current block is the AMVP mode.

The prediction block generation unit 245 generates the prediction block of the current block using the motion information reconstructed by the merge mode motion information decoding unit 243 or the AMVP mode motion information decoding unit 244.

When the motion vector is an integer unit, the prediction block of the current block may generate by copying a block corresponding to a position indicated by the motion vector in the picture indicated by the reference picture index.

On the other hand, when the motion vector is not an integer unit, the pixels of the prediction block are generated from the integer unit pixels in the picture indicated by the reference picture index, in this case, an 8-tap interpolation filter may be used for a luminance pixel, and a 4-tap interpolation filter may be used for a chrominance pixel to generate the prediction pixel.

The residual block decoding unit 246 entropy decodes the residual signal, inversely scans the entropy-decoded coefficients to generate a two-dimensional quantized coefficient block, the inverse scanning method can be changed according to the entropy decoding method.

For example, as decoding based on CABAC, the inverse scanning method may be applied to the diagonal direction raster inverse scan method, while as decoding based on CAVLC, the inverse scanning method can be applied to the zigzag reverse scan method. In addition, the inverse scanning method may be determined differently depending on the size of the prediction block.

The residual block decoding unit 246 dequantizes the generated coefficient block using the inverse quantization matrix, the quantization parameter may be reconstructed to derive the quantization matrix. Here, the quantization step size can be reconstructed for each coding unit of a predetermined size or more.

The residual block decoding unit 260 reconstructs the residual block by inversely transforming the inverse quantized coefficient block.

The reconstruction block generation unit 270 generates reconstruction blocks by adding the prediction blocks generated by the prediction block generation unit 250 and the residual blocks generated by the residual block decoding unit 260.

Hereinafter, an embodiment of a process of restoring a current block through the intra prediction will be described with reference to FIG. 7.

First, the intra prediction mode of the current block is decoded from the received bit stream, for this purpose, an entropy decoding unit 210 can reconstruct the first intra prediction mode index of the current block by referring to one of a plurality of intra prediction mode tables.

The intra prediction mode tables are tables shared by the encoding apparatus 10 and the decoding apparatus 20, any one of the tables selected in accordance with the distribution of the intra prediction mode for a plurality of blocks adjacent to the current block can be applied.

For example, if the intra prediction mode of the left block of the current block is the same as the intra prediction mode of the top block of the current block, the first intra prediction mode table is applied to restore the first intra prediction mode index of the current block, while if not, the second intra prediction mode table may be applied to reconstruct the first intra prediction mode index of the current block.

As another example, when the intra prediction modes of the top block and the left block of the current block are both the directional intra prediction mode, the prediction mode index of the current block is reconstructed by applying the first intra prediction mode table if the direction of the intra prediction mode of the top block and the direction of the intra prediction mode of the left block are within a predetermined angle, while the first intra prediction mode index of the current block is reconstructed by applying the second intra prediction mode table, if the direction is out of the predetermined angle.

The entropy decoding unit 210 transmits the first intra prediction mode index of the reconstructed current block to the intra prediction unit 230.

The intra prediction unit 230, which receives the first intra prediction mode index, and can determine the maximum possible mode of the current block as the intra prediction mode of the current block when the index has a minimum value (i.e., 0).

On the other hand, the intra prediction unit 230, compares the index indicated by the maximum possible mode of the current block with the first intra prediction mode index when the index has a value other than 0. As the comparison result, if the first intra prediction mode index is not smaller than the index indicated by the maximum possible mode of the current block, the intra prediction unit may determine the intra prediction mode corresponding to a second intra prediction mode index obtained by adding 1 to the first intra prediction mode index as the intra prediction mode of the current block. Otherwise, the intra prediction unit may determine the intra prediction mode corresponding to the first intra prediction mode index may be determined as the intra prediction mode of the current block.

The allowable intra prediction mode for the current block may be configured with at least one non-directional mode and a plurality of directional modes.

The one or more non-directional modes may be the DC mode and/or the planar mode. In addition, either the DC mode or the planar mode may be adaptively included in the allowable intra prediction mode set.

To this end, information specifying the non-directional mode included in the allowable intra prediction mode set may be included in the picture header or slice header.

Next, the intra prediction unit 230 reads the reference pixels from the picture storage unit 260 to generate the intra prediction blocks and the reference picture memory unit 260 determines whether or not there is a reference pixel which is not available.

The determination may be performed according to whether there are reference pixels used to generate the intra prediction block by applying the decoded intra prediction mode of the current block.

Next, when it is necessary to generate the reference pixel, the intra prediction unit 230 may generate the reference pixels at positions that are not available by using previously reconstructed available reference pixels.

The definition of the reference pixel that is not available and the method of generating the reference pixel may be the same as the operation in the intra prediction unit 150 according to FIG. 1, The reference pixels used for generating the intra prediction block may be selectively reconstructed according to the decoded intra prediction mode of the current block.

In addition, the intra prediction unit 230 determines whether to apply a filtering to the reference pixels to generate the prediction block. That is, it is possible to determine whether to apply the filtering to the reference pixels to generate an intra prediction block of the current block based on the decoded intra prediction mode and the size of the current prediction block.

Since the problem of the blocking artifact becomes larger as the size of the block increases, the number of prediction modes for filtering the reference pixel may be increase when the size of the block is more larger. But the reference pixel may not be filtered to reduce the complexity, when the block is larger than a predetermined size, it can be regarded as a flat area.

If it is determined that the reference pixel needs to be applied to the filter, the intra prediction unit 230 filters the reference pixels using the filter.

At least two or more filters may be adaptively applied according to the degree of difference between the reference pixels. The filter coefficient of the filter is preferably symmetrical.

In addition, the above two or more filters may be adaptively applied according to the size of the current block. When filters are applied, a filter having the narrow bandwidth may be applied to a block having the small size, and other filter having the wide bandwidth may be applied to a block having a large size.

In the case of DC mode, since a prediction block is generated with an average value of reference pixels, there is no need to apply the filters, it is not necessary to apply the filter to the reference pixel in the vertical mode in which the image has correlation in the vertical direction, while it may not be necessary to apply the filter to the reference pixel even in the horizontal mode in which the image has correlation in the horizontal direction.

In this way, whether or not the filtering is applied has correlation to the intra prediction mode of the current block, the reference pixel can be adaptively filtered based on the intra prediction mode of the current block and the size of the prediction block.

Next, the intra prediction unit 230 generates the prediction block using the reference pixel or the filtered reference pixels according to the reconstructed intra prediction mode. The generation of the prediction block may be the same as the operation in the encoding device 10, and the detailed description thereof will be omitted.

The intra prediction unit 230 determines whether to filter the generated prediction block, the filtering operation may be determined using the information included in the slice header or the encoding unit header or according to the intra prediction mode of the current block.

If it is determined that the generated prediction block is to be filtered, the intra prediction unit 230 filters the pixel at a specific position in the prediction block generated using the available reference pixels adjacent to the current block to generate new pixels.

For example, in the DC mode, the prediction pixel in contact with the reference pixels among the prediction pixels may be filtered using the reference pixel in contact with the prediction pixel.

Accordingly, the predictive pixel is filtered using one or two reference pixels according to the position of the predictive pixel, the filtering of the prediction pixel in the DC mode can be applied to the prediction block of all sizes.

On the other hand, in the vertical mode, prediction pixels adjacent to the left reference pixel among the prediction pixels of the prediction block can be changed using reference pixels other than the top pixel used to generate the prediction block.

Likewise, in the horizontal mode, prediction pixels adjacent to the top reference pixel among the generated prediction pixels may be changed using reference pixels other than the left pixel used to generate the prediction block.

The current block can be reconstructed using the predicted block of the current block reconstructed in this manner and the residual block of the decoded current block.

Figure 9:
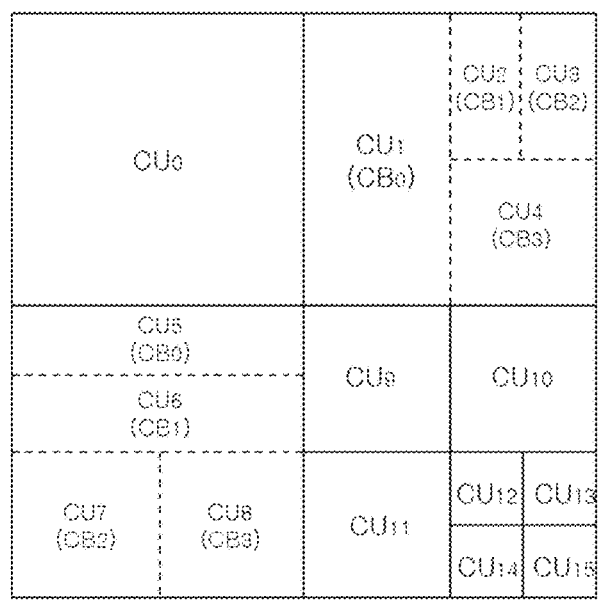
FIG. 9 is a diagram for explaining a second embodiment of a method of dividing and processing an image into a plurality of block units.

FIG. 9 is a view for explaining a second embodiment of a method of dividing and processing the image into block units.

Referring to FIG. 9, a coding tree unit CTU having a maximum size of 256×256 pixels is first divided into a quad tree structure, and can be divided into four coding units CUs having the form of a square.

Here, at least one of the coding units divided into the quad tree structure is divided into a binary tree structure, and can be subdivided into two coding units CU having a rectangular shape.

At least one of the coding units divided into the quad tree structure is divided into the quad tree structure, and may be subdivided into four coding units CUs having the form of the square.

And at least one of the subdivided coding units into the binary tree structure is subdivided into a binary tree structure again, and may be divided into two coding units CUs having the form of a square or a rectangle.

At least one of the coding units subdivided into the quad tree structure is divided into the quad tree structure or the binary tree structure, and may be divided into coding units CUs having the form of the square or the rectangle.

Coding blocks CBs divided and configured into the binary tree structure as described above can be used for prediction and conversion without being further divided. That is, the size of the prediction unit PU and the conversion unit TU belonging to the coding block CB, as shown in FIG. 9, may be the same as the size of the coding block CB.

Figure 4:
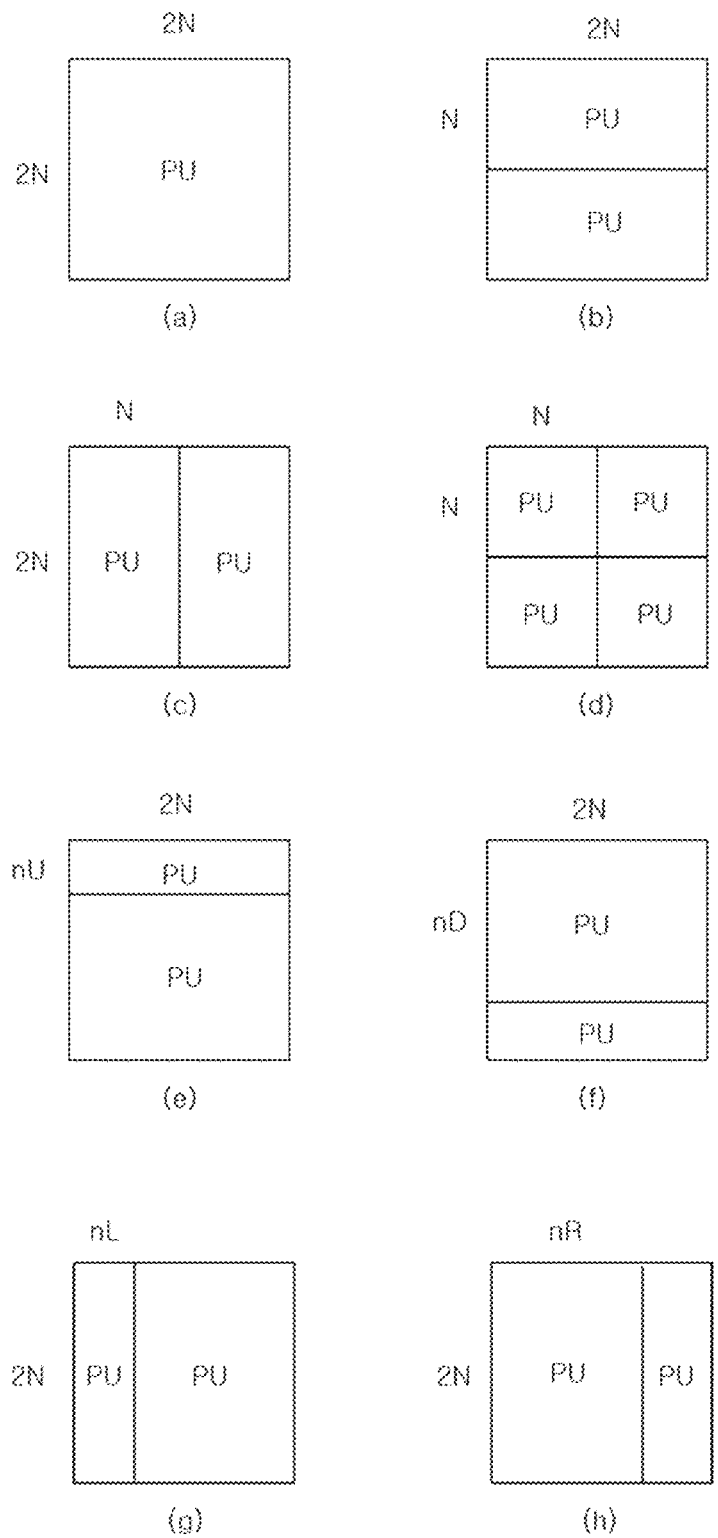

The coding unit divided into the quad tree structures as described above can be divided into one or more prediction units PUs using the method as described with reference to FIGS. 3 and 4.

In addition, the coding unit divided into the quad tree structure as described above can be divided into one or two or more conversion units TU using the method described with reference to FIG. 5, and the divided conversion unit TU can have a maximum size of 64×64 pixels.

FIG. 10 shows an embodiment of a syntax structure used for dividing and processing the image into block units.

Referring to FIG. 10, whether or not of the division of the coding unit CU as described with reference to FIG. 9 is expressed using split_cu_flag.

The depth of the coding unit CU divided using the binary tree can be expressed using binary_depth.

In addition, whether or not the coding unit CU is divided into a binary tree structure may be represented by a separate binary_split_flag.

For the blocks (e.g., the coding unit CU, the prediction unit PU, and the conversion unit TU) divided, the encoding and decoding operation of the image can be performed by the method as described with reference to FIGS. 9 and 10.

Hereinafter, with reference to FIGS. 11 to 16, still another embodiment of a method of dividing the coding unit CU into one or two or more conversion units TU will be described.

According to the embodiment of the present invention, the coding unit CU can be divided into conversion units TUs which are basic units in which the conversion to the residual block is divided into a binary tree structure.

Figure 11:
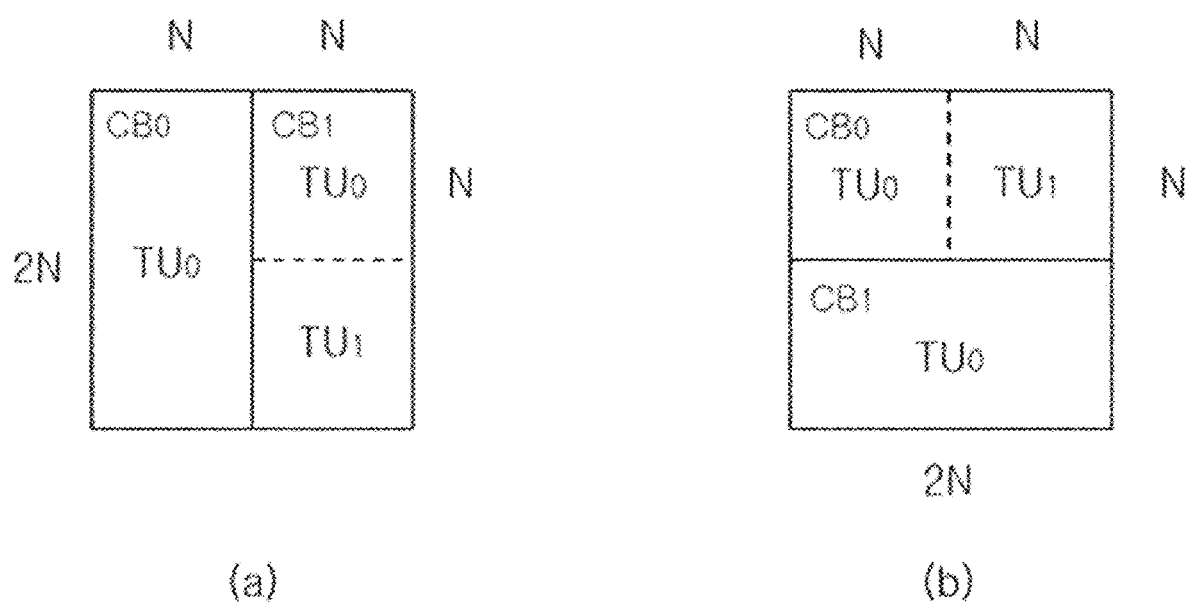
FIG. 11 is a diagram for explaining a third embodiment of a method of dividing and processing an image into a plurality of block units.

Referring to FIG. 11, at least one of the rectangular coding blocks CB0 and CB1 having a size of N×2N or 2N×N divided into the binary tree structure is divided into the binary tree structure again, and can be divided into square conversion units TU0 and TU1 having the size of N×N.

As described above, the block-based image encoding method can perform prediction, conversion, quantization, and entropy encoding steps, respectively.

In the prediction step, a predictive signal is generated by referring to a current encoding block and an existing encoded image or a surrounding image, and the difference signal with the current block can be calculated through the predictive signal.

On the other hand, in the conversion step, the conversion is performed using various conversion functions by inputting the differential signal, the converted signal is classified into a DC coefficient and an AC coefficient to achieve the energy compaction so that the coding efficiency can be improved.

In the quantization step, the quantization is performed by inputting the transform coefficients, then, entropy encoding is performed on the quantized signal, so that the image can be encoded.

On the other hand, the image decoding method proceeds in the reverse order of the encoding process as described above, and the image quality distortion phenomenon may occur in the quantization step.

A method for reducing the image quality distortion while improving the coding efficiency, the size or shape of the conversion unit TU and the type of conversion function to be applied can be varied according to the distribution of the differential signal input as an input signal in the conversion step and the characteristics of the image.

For example, if a block similar to the current block is searched through the block-based motion estimation process in the prediction step, the distribution of the differential signal can be generated in various forms according to the characteristics of the image using a cost measurement method such as Sum of Absolute Difference SAD or Mean Square Error MSE.

Thereby, the effective encoding can be performed by selectively determining the size or shape of the conversion unit CU based on the distribution of the various difference signals and performing the conversion.

Figure 12:
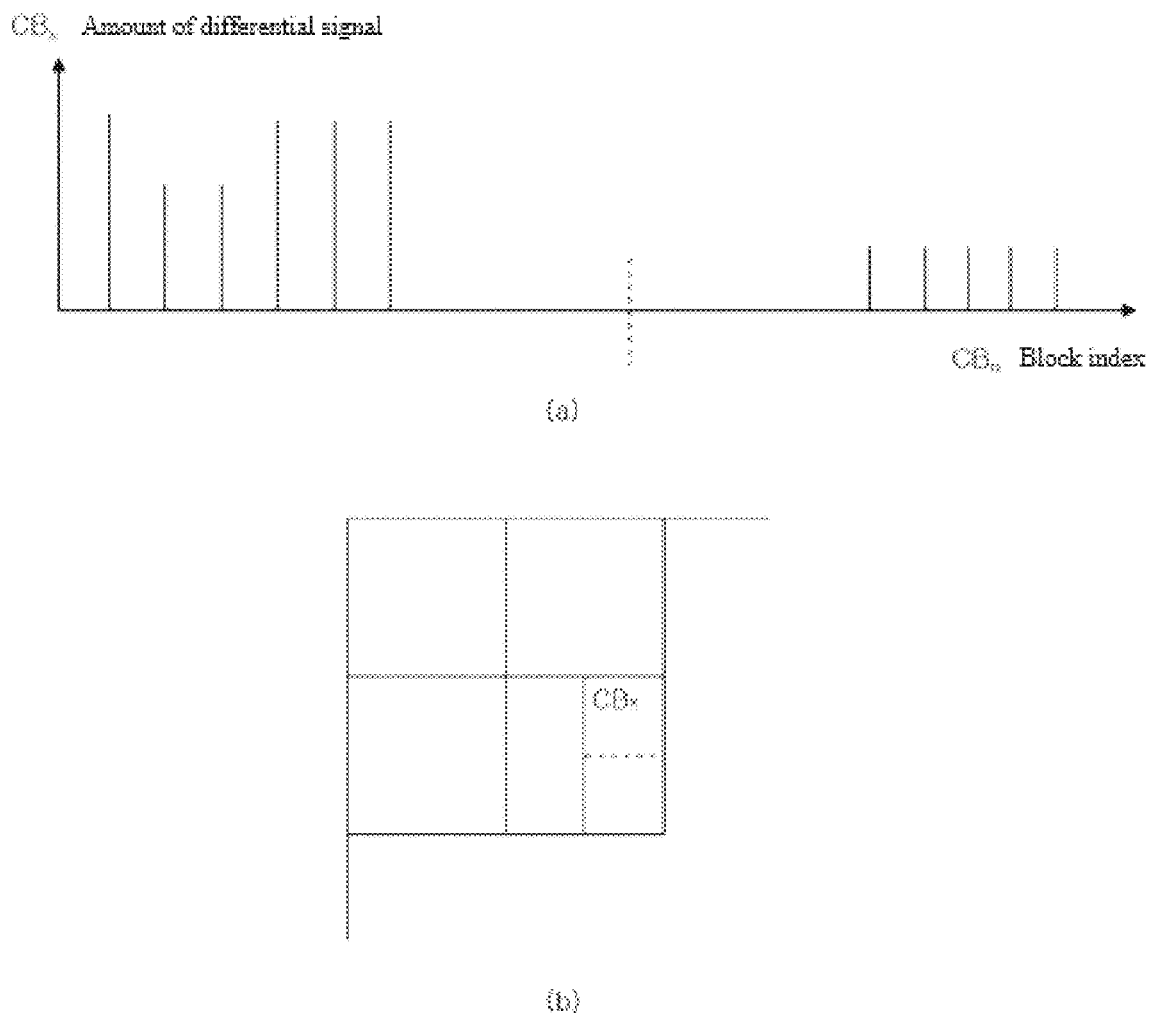
FIG. 12 is a diagram for explaining an embodiment of a method of dividing a coding unit into a binary tree structure to structure a conversion unit.

Referring to FIG. 12, when the difference signal is generated in a certain coding block CBx as shown in FIG. 12(a), the coding block CBx is divided into the binary tree structure and divided into two conversion units TU, thereby performing the effective conversion as shown in FIG. 12(b).

For example, it can be indicated that the DC value generally represents the average value of the input signal, when the difference signal is received as an input of a conversion process as shown in FIG. 12(a), the DC value can be effectively represented by dividing the coding block CBx into two conversion units TU.

Figure 13:
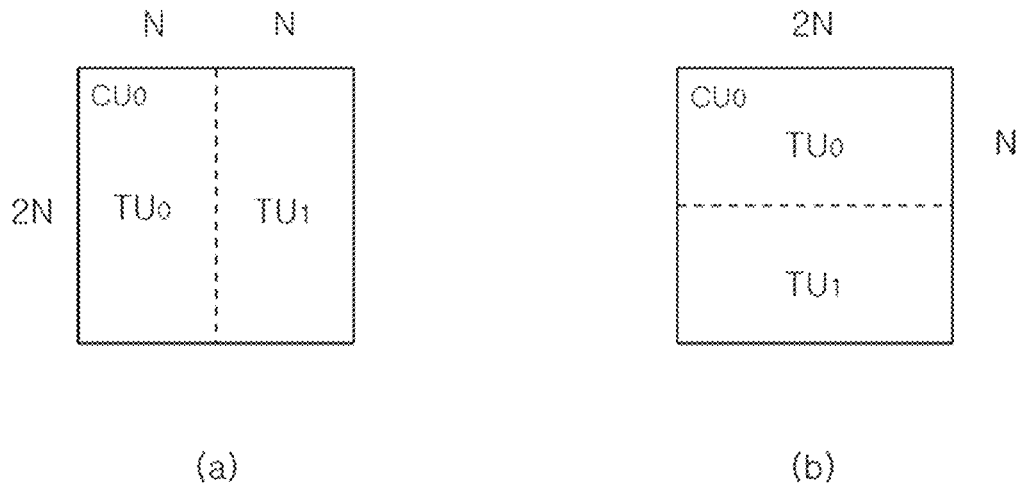
FIG. 13 is a diagram for explaining a fourth embodiment of a method of dividing and processing an image into a plurality of block units.

Referring to FIG. 13, a square coding unit CU0 having a size of 2N×2N is divided into a binary tree structure, and can be divided into rectangular transform units TU0 and TU1 having a size of N×2N or 2N×N.

According to another embodiment of the present invention, As described above, the step of dividing the coding unit CU into the binary tree structure is repeated two or more times, and can be divided into a plurality of conversion units TU.

Figure 14:
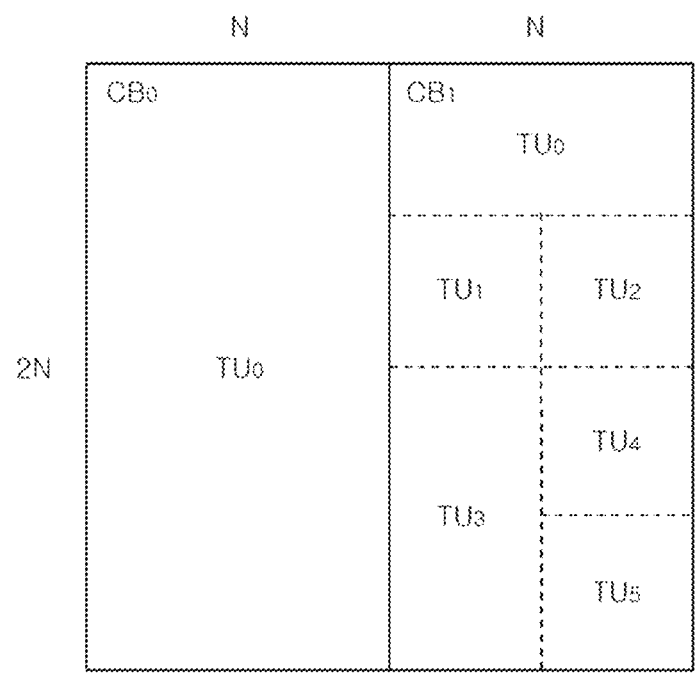
FIGS. 14 to 16 are diagrams for explaining a fourth embodiment of a method for dividing and processing an image into a plurality of block units.

Referring to FIG. 14, a rectangular coding block CB1 having a size of N×2N is divided into a binary tree structure, the block having the size of the divided N×N is divided into the binary tree structure to form a rectangular block having a size of N/2×N or N×N/2, the block having the size of N/2×N or N×N/2 may be divided into the binary tree structure and divided into square conversion units TU1, TU2, TU4, and TU5 having a size of N/2×N/2.

Figure 15:
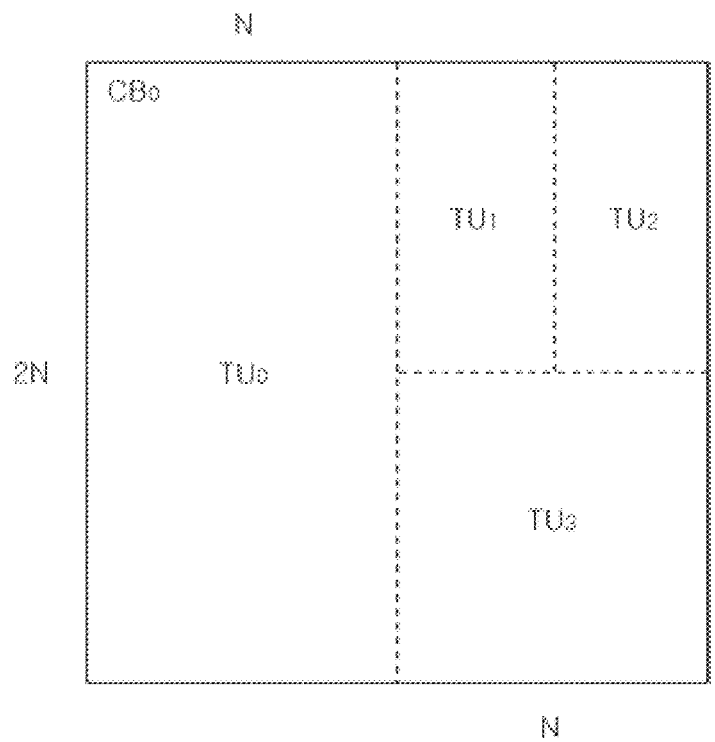

Referring to FIG. 15, a square coding block CB0 having a size of 2N×2N is divided into a binary tree structure, the block having the size of the divided N×2N is divided into the binary tree structure to form a square block having a size of N×N, the block having the size of N×N may be divided into the binary tree structure and divided into rectangular transform units TU1 and TU2 having a size of N/2×N.

Figure 16:
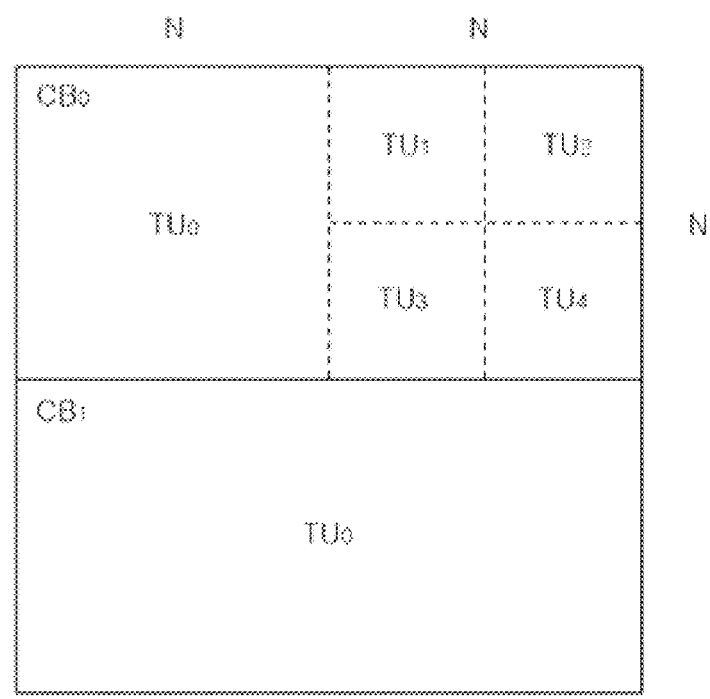

Referring to FIG. 16, the rectangular coding block CB0 having a size of 2N×N is divided into a binary tree structure, the block having the size of the divided N×N is divided into the quad tree structure again to divide into square conversion units TU1, TU2, TU3, TU4 having a size of N/2×N/2.

For the blocks (e.g., the coding unit CU, the prediction unit PU, and the conversion unit TU divided, the encoding and decoding operation of the image can be performed by the method as described with reference to FIGS. 11 to 16.

Hereinafter, embodiments of a method in which the encoding apparatus 10 according to the present invention determines a block division structure will be described.

The picture division unit 110 provided in the image encoding apparatus 10 performs rate distortion optimization RDO according to a preset sequence to determine the division structure of the divisible coding unit CU, the prediction unit PU and the conversion unit TU as described above.

For example, to determine the block division structure, the picture division unit 110 performs a rate distortion optimization-quantization RDO-Q to determine the optimal block division structure in view of bit rate and distortion.

Figure 17:
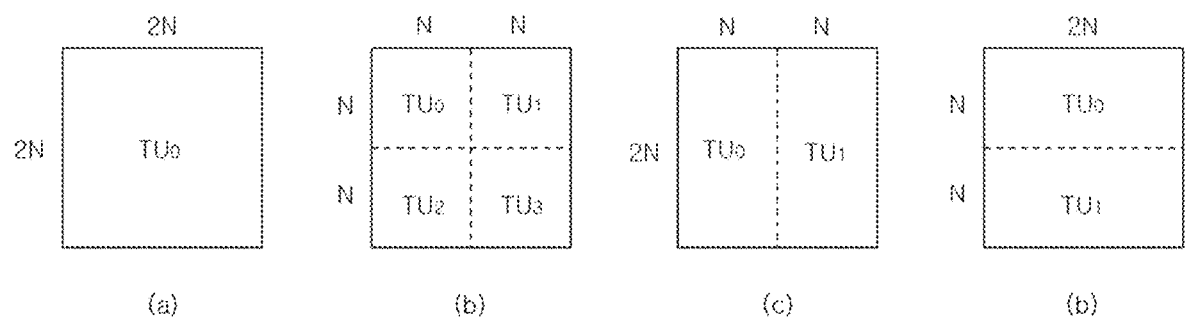
FIGS. 17 and 18 are diagrams for explaining embodiments of a method of performing a rate distortion optimization RDO to determine a division structure of a conversion unit.

Referring to FIG. 17, when the coding unit CU has a form of 2N×2N pixel size, the RDO is performed the following sequence of division structure of the 2N×2N pixel size shown in FIG. 17(a), the N×N pixel size shown in FIG. 17(b), the N×2N pixel size shown in FIG. 17 (c), and the 2N×N pixel size shown in To determine an optimal partition structure of the conversion unit PU shown in FIG. 17(d).

Figure 18:
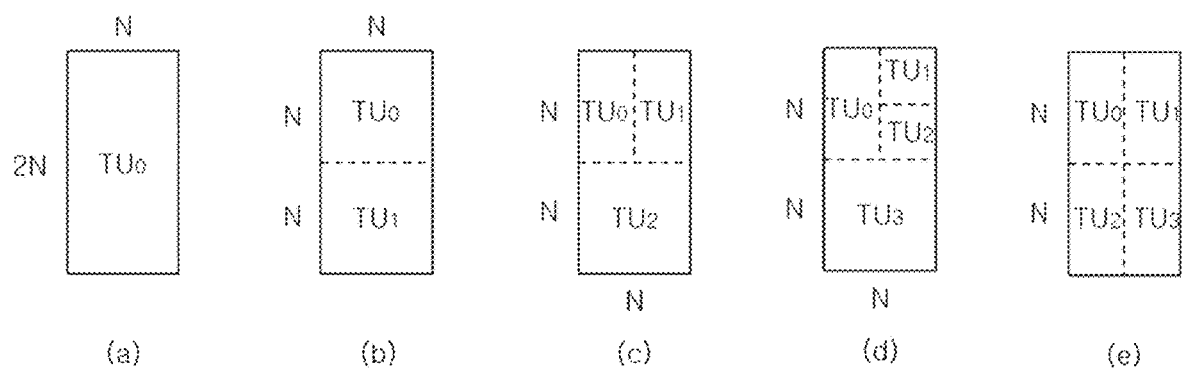

Referring to FIG. 18, when the coding unit CU has the form of N×2N or 2N×N pixel size, the RDO is performed the following sequence of division structure of the N×2N(or 2N×N/2) pixel size shown in FIG. 18(a), the N×N pixel size shown in FIG. 18(b), the N/2×N(or N×N/2) and N×N pixel size shown in FIG. 18(c), the N/2×N/2, N/2×N and N×N pixel size shown in FIG. 18(d), and the N/2×N pixel size shown in FIG. 18(e).

In the above description, the block division method of the present invention has been described by exemplifying that the block division structure is determined by performing rate distortion optimization RDO, the picture division unit 110 determines the block division structure using sum of absolute difference SAD or mean square error MSE, thereby maintaining the efficiency while reducing the complexity.

According to an embodiment of the present invention, it is determined whether adaptive loop filtering ALF is applied in units of the cording unit CU, the prediction unit PU or the conversion unit TU as described above.

For example, whether or not the adaptive loop filter ALF is applied can be determined on a coding unit CU basis, the size or coefficient of the loop filter to be applied may vary according to the coding unit CU.

In this case, information indicating whether or not the adaptive loop filter ALF is applied for each coding unit CU may be included in each slice header.

In the case of the color difference signal, it may be determined whether or not the adaptive loop filter ALF is applied, the shape of the loop filter may have a rectangular shape unlike the luminance.

In addition, the adaptive loop filtering ALF may determine whether to apply for each slice, thus, information indicating whether adaptive loop filtering ALF is applied to the current slice may be included in the slice header or the picture header.

If the current slice indicates that adaptive loop filtering is applied, the slice header or picture header may additionally include information indicating the horizontal and/or vertical filter length of the luminance component used in the adaptive loop filtering process.

The slice header or picture header may include information indicating the number of filter sets, if the number of filter sets is two or more, the filter coefficients may be encoded using a prediction method.

Accordingly, the slice header or the picture header may include information indicating whether or not the filter coefficients are encoded in the prediction method, and the predicted filter coefficients is included in the prediction method.

On the other hand, not only luminance but also chrominance components can be adaptively filtered, in this case, information indicating whether each of the color difference components is filtered may be included in the slice header or the picture header, the above information is performed by joint cording. (ie., multiplexed coding) with information indicating whether to filter for Cr and Cb to reduce the number of bits.

In the case of chrominance components, since Cr and Cb are not all filtered in order to reduce the complexity, if neither Cr nor Cb is filtered, the entropy encoding can be performed by allocating the smallest index.

When both Cr and Cb are filtered, the entropy encoding can be performed by allocating the largest index.

Figure 19:
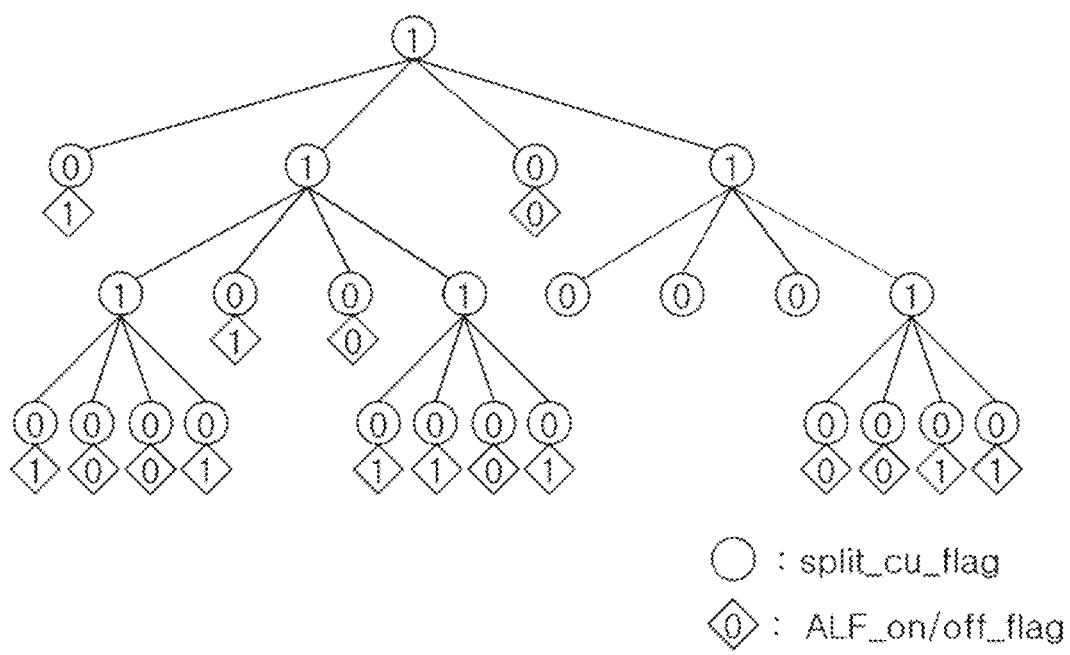
FIG. 19 is a diagram for explaining a block-based adaptive loop filtering method according to a first embodiment of the present invention.

Referring to FIG. 19, a coding tree unit CTU having a maximum size of 256×256 pixels as shown in FIG. 19(a) is divided into a quad tree structure, and can be divided into four coding units CUs having the form of a square.

In addition, each of the four coding units CU having the square shape can be divided into the quad tree structures, as described above, the depth of a coding unit CU divided into the quad tree structure may have an integer value from 0 to 3.

On the other hand, it can be determined whether adaptive loop filtering ALF is applied to each of the divided code units CU as shown in FIG. 19(a), the division structure of the coding unit CU including whether or not the adaptive loop filtering ALF is applied can be expressed as shown in FIG. 19(b).

Here, split_cu_flag indicates whether or not the corresponding node is divided, if split_cu_flag is 0, the coding unit CU of the corresponding node is not divided into blocks of smaller size. But, if split_cu_flag is 1, the coding unit CU of the node is divided into coding units CU of a smaller size.

Also, ALF_on/off_flag indicates whether or not the adaptive loop filter ALF of the corresponding node is applied, if ALF_on/off_flag is 0, the adaptive loop filter ALF is not applied to the coding unit CU of the corresponding node. But, if ALF_on/off_flag is 1, the adaptive loop filter ALF is applied.

Referring to FIG. 20, a coding tree unit CTU having a maximum size of 256×256 pixels is divided into a quad tree structure as shown in FIG. 20(a), and can be divided into four coding units CUs having the form of a square.

Here, at least one of the coding units divided into the quad tree structure is divided into a binary tree structure, and can be subdivided into two coding units CU having a rectangular shape.

At least one of the coding units divided into the quad tree structure is divided into the quad tree structure, and may be subdivided into four coding units CUs having the form of a square.

And at least one of the coding units subdivided into the binary tree structure is subdivided into a binary tree structure again, and may be divided into two coding units CUs having the form of the square or the rectangle.

At least one of the coding units subdivided into the quad tree structure is divided into the quad tree structure or the binary tree structure, and may be divided into coding units CUs having the form of the square or the rectangle.

On the other hand, it can be determined whether the adaptive loop filtering ALF is applied to each of the divided code units CU as shown in FIG. 20(a), the division structure of the coding unit CU including whether or not the adaptive loop filtering ALF is applied can be expressed as shown in FIG. 20(b).

In FIG. 20(b), the solid line connecting the nodes means that the top node is divided into the quad tree structure to form the down nodes, the dotted line connecting the nodes means that the top node is divided into the binary tree structure to form the down nodes.

Figure 21:
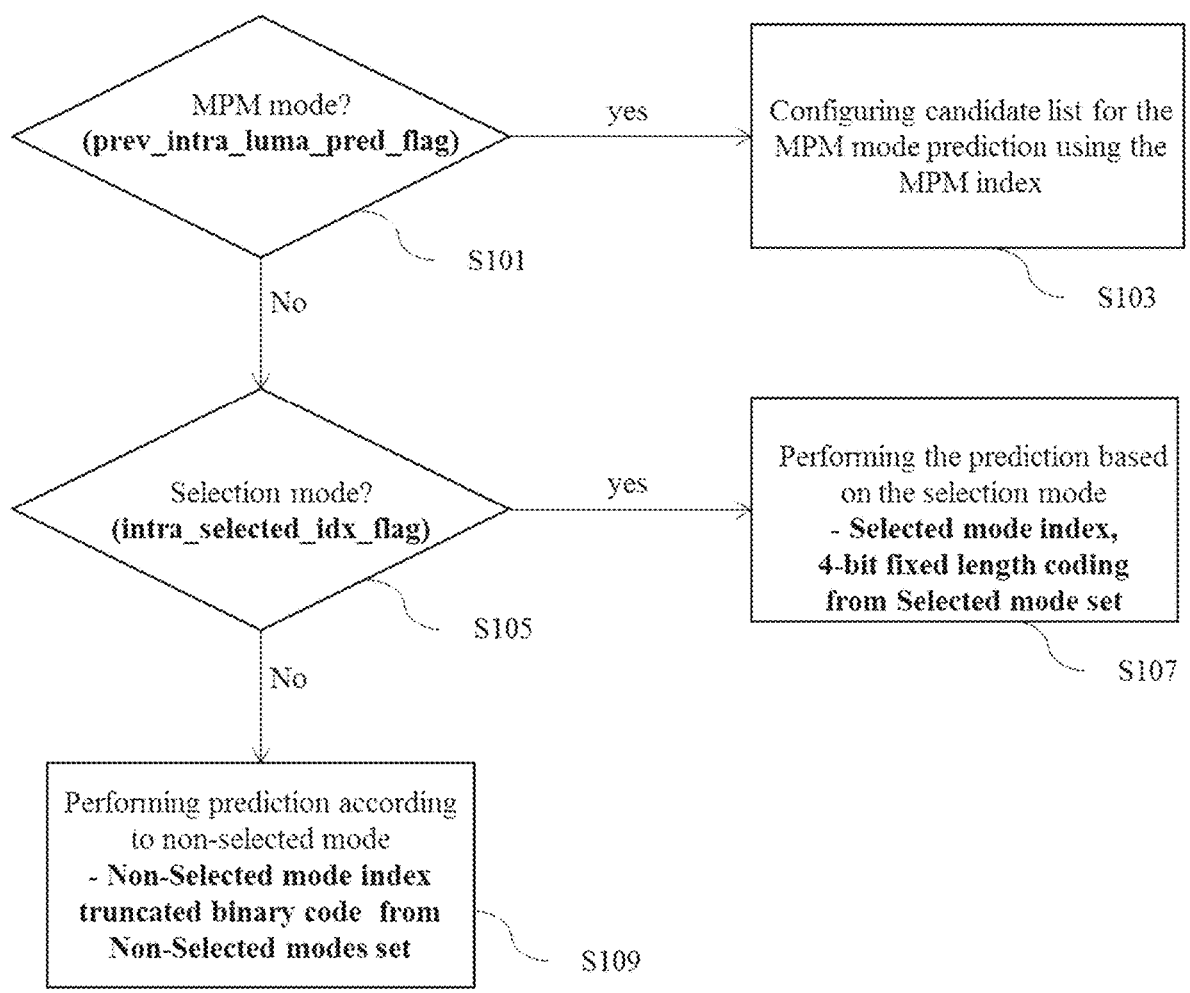
FIG. 21 is a flowchart illustrating an operation of an image decoding device for performing intra prediction according to an embodiment of the present invention.

FIG. 21 is a flowchart illustrating an operation of the decoding device 20 for performing intra prediction according to an embodiment of the present invention.

According to another embodiment of the present invention, the image encoding apparatus 10 may encode and transmit the intra prediction mode. The image encoding apparatus 10 can use method of predicting the intra prediction mode for the intra prediction direction through the intra prediction unit 150 to reduce the amount of transmitted bits and increase the coding efficiency, when it is encoded and transmitted the intra prediction mode for the current block. The decoding device 20 receives the signaling information therefrom, and performs the intra prediction decoding using the prediction mode selected from the intra prediction mode candidates.

In particular, since the prediction mode of the current block is likely to be the same as the prediction mode of an adjacent Neighboring Block, the image encoding apparatus 10 may encode the prediction mode of the encoding target block using the prediction mode of neighboring blocks adjacent to the current block through the intra prediction unit 150. Hereinafter, the prediction modes used as prediction values for the intra prediction modes of the encoding target may be referred to as MPM (Most Probable Mode). Hereinafter, the Neighboring Block means a block adjacent to the current block.

The intra prediction unit 150 may derive an MPM candidate mode from neighboring blocks adjacent to the current block, and may generate the MPM list using the derived MPM candidate mode. In this case, the intra prediction unit 150 may assign the MPM candidate modes derived from the neighboring blocks to the MPM list. Then, the intra prediction unit 150 can encode the intra prediction mode using the generated MPM list.

The image encoding apparatus 10 can perform the intra prediction encoding for the prediction mode of the current block to be encoded in the MPM list. In this way, when performing the encoding method for the current encoding block using a derivation method of the prediction mode of the Neighboring block, the image encoding apparatus 10 can transmit a separate flag to the decoder.

More specifically, the prediction mode candidate of the neighboring block can be configured from the MPM List. When the prediction mode of the current block using at least one prediction mode of the MPM List is derived, the image coding apparatus 10 determines whether or not the intra-picture prediction encoding is performed through the MPM List, And assigns a predetermined value to the MPM Flag corresponding thereto.

Also, the MPM Flag can be transmitted to the image decoding apparatus 20, the image decoding apparatus 20 can perform the decoding for the current block by configuring the MPM List in the same manner as the encoding method of the image encoding apparatus 10. At this time, the MPM Flag can be used as a flag for judging whether or not the current block is encoded using the MPM List of the current block. In one embodiment, the MPM Flag transmitted to the video decoding apparatus 20 may be expressed by a syntax such as prev_intra_luma_pred_flag or MPM_Flag. For example, if the current block is a block in which the encoding is performed by deriving a prediction direction in the MPM list, 1 may be assigned in the MPM Flag, otherwise 0 may be assigned.

On the other hand, if it is not encoded through the MPM Mode (MPM Flag==False), the image encoding apparatus 10 can process the intra-picture prediction mode encoding according to a process of either Selected Mode or Non-Selected Mode.

When encoding is performed in the Selection Mode, the image encoding apparatus 10 may perform Fixed Length Coding for Angular mode not included in the MPM Mode according to the number of directional modes and transmit to the image decoding apparatus 20. At this time, the image encoding apparatus 10 may transmit the selected mode flag to the image decoding apparatus 20 wherein the flag indicates that whether the intra prediction encoding is performed through the selection mode.

Here, when the intra-picture prediction coding is performed in the selection mode, the picture coding apparatus 10 assigns 1 in the Selected_mode_Flag. When the intra-picture prediction coding is performed in the non-selection mode, 0 can be assigned in the Selected_mode_flag. When the intra-picture prediction coding is performed in the non-selection mode, the image encoding apparatus 10 may encode one of the prediction direction from the MPM Mode and not selected in the selection mode through truncated binary coding and transmit to the image decoding apparatus 20.

If the MPM candidate mode exists in the MPM list that is the same as the prediction mode of the encoding target block, the encoder may transmit to the decoder an index indicating which MPM candidate mode is derived from in the MPM list the prediction mode of the current block to be encoded. Hereinafter, the index is referred to as an MPM index. In one embodiment, the MPM index may be denoted as mpm_idx.

In configuring the MPM list, the image encoding apparatus 10 may remove the overlapping prediction mode through a pruning process or the like to eliminate overlapping prediction modes. In addition, the image encoding apparatus 10 may configure the MPM List using the intra-picture prediction mode and an arbitrary prediction mode of neighboring blocks of the current block in the order of configuring the MPM list.

As an example of configuring such the MPM List, the image encoding apparatus 10 configures the MPM List by following order that of Left block, Above block, Below-Left block, Above-Right block, and Above-Left block. The DC or Planar mode is configured after removing the overlapping prediction mode from the neighboring blocks to fill the MPM List, thereby completing the MPM List configuration. In this case, the initial mode of the MPM List may include Left, Above, Planar, DC, Below-Left, Above-Right and Above-Left. This order can be adjusted in accordance with standards and the coding efficiency.

In particular, according to an embodiment of the present invention, at least one of the coding units divided into the quad-tree structure, and the quad-tree structure is subdivided into a binary tree structure again, subdivided into two coding units CU having the shape of the rectangle, or divided into four coding units CUs having the form of the square. And at least one of the subdivided coding units into the binary tree structure is subdivided into the binary tree structure, considering a structure that can be subdivided into two coding units CUs having the form of the square or the rectangle. In addition, the information on the divided structure can be used to configure the MPM candidate list.

At this time, as the quad tree structure and the binary tree structure as described above are applied in combination. It may be necessary to determine whether the MPM candidate mode is used for the coding efficiency and an additional processing corresponding to the case that the MPM mode is not.

Before the embodiment of the intra-picture prediction coding for this, as shown in FIG. 9 described above, the coding unit for performing encoding is divided into a square block, a horizontally oriented rectangular block or a vertically oriented rectangular block. In case of performing the intra-picture prediction with the rectangular block in the horizontal/vertical direction. The direction in which the prediction is performed may be determined according to the characteristics of the block and the characteristics of the surrounding blocks and the conditions in which the surrounding blocks are encoded. Accordingly, the image encoding apparatus 10 can adjust the configuration order of the MPM List. At this time, the characteristics of the block may be exemplified by the shape and depth, the width, the height, and the size of the block.

An example of the MPM List configuration order adjustment of a block, performing the current intra-picture prediction coding according to the characteristics of the encoded neighboring blocks, may be as follows. If one of the neighboring blocks is coded in a horizontal intra-direction and the current encoded block in the prediction mode is performed in a horizontally oriented rectangular block. The image encoding apparatus 10 may configure the MPM List by adjusting the order of the MPM List so that the encoded neighboring blocks in the prediction direction similar to the characteristics and shapes of the current block are given priority or height priority.

Similarly, when one of the neighboring blocks is encoded in a vertical intra-directional direction, and the block currently performing the intra prediction is a vertically oriented rectangular block. The image encoding apparatus 10 may configure the MPM List by adjusting the order of the MPM List so that the encoded neighboring blocks in the prediction direction similar to the characteristics and shapes of the current block are given priority or height priority.

When the MPM List is adjusted as in the above embodiments, for example, when the original in the general case or first MPM List is {Planar, DC, 2, Hor, Ver, Digonal}, the prediction mode having the horizontal or vertical direction is adjusted such as {Hor, Planar, DC, 2, Ver, Digonal} or {Ver, Planar, DC, 2, Hor, Diagonal} with priority and height priority depending on the prediction mode direction of the neighboring blocks and the characteristics of the current block. At this time, the image encoding apparatus 10 can determine whether or not it is to be adjusted by using a predetermined rule with the decoding device 20 or by transmitting a specific signal to the decoding device 20 separately.

More specifically, the decoding device 20 can operate as shown in FIG. 21 the intra prediction mode is determined by deriving the prediction direction of a decoding target block from the intra prediction direction (angular mode) of a neighboring block of the above structure.

First, the decoding device 20 determines whether it is the MPM mode according to the MPM flag (prev_intra_luma_pred_flag) or MPM-Flag (S101).

In the MPM mode, the decoding device 20 configuring a candidate list for the MPM mode prediction using the MPM index (MPM_idx) (S103).

Here, the decoding device 20 determines the MPM candidate list by using the prediction mode of a neighboring block which can be referred to from the decoding target block. For example, the decoding device 20 may configure up to six MPM lists based on the prediction mode of at least five neighboring blocks.

In addition, the decoding device 20 parses the MPM mode flag and the MPM index for the prediction of a decoding target block, and the intra prediction decoding is performed by deriving the prediction direction of the current block. For example, 65 modes, DC, and Planar mode may be used for the prediction direction (Angular mode), the MPM list can be constructed by referring to at least five blocks coded from the current block into the surrounding left/left top/left down/top/top right intra blocks, as candidates.

If the MPM List could not be filled through the prediction mode of the neighboring block, the decoding apparatus 20 configures the MPM List in a Unique angular mode by applying an offset value by adding +1, +2, +3, ... or −1, −2, −3, ... to the previously filled in an Angular mode, if the MPM List could not be configured by the above method, the MPM List can be configured through any predefined MPM List table or a defined MPM List set.

On the other hand, in the case of not the MPM mode, two modes can be exemplified. One is a selection mode, which can be represented by a selection mode flag (Selected Mode Flag). The decoding device 20 may determine the selection mode according to whether the value of the selection mode flag is 0 or 1 (S105).

In the case of not the MPM mode, additional modes may be included that are configured in a non-overlapping manner through certain constraints to derive the prediction direction, and the index for this can be processed by fixed length coding or truncated binary coding. A mode set (SET) is formed by dividing the two cases, it can be processed by setting the selected mode or the non-selected mode, respectively.

In the selection mode, the decoding device 20 determines and configures a certain set of selection modes as described above, and can perform the prediction based the selection mode (S107).

The selection mode list can be configured based on a multiple of a certain natural number. The decoding device 20 may then receive the selected mode index or Selected mode Flag==True and derive one of prediction direction among the selected mode sets, and the 4-bit fixed length coding can be exemplified for the prediction coding for the index of the selection mode.

In the non-selection mode, the decoding device 20 determines and configures the non-selection mode set configured in a mode not included in the selection mode, prediction based on the prediction can be performed (S109).

Also, the decoding device 20 receives the non-selection mode index to derive the prediction direction of one of the non-selection mode sets, and cut binary coding can be exemplified for predictive coding for the index of the selection mode.

As one embodiment of the decoding method according to the selection mode and the non-selection mode, 61 prediction modes not included in the MPM List include Selection Mode Set having 16 prediction modes and Non-Selected Modes Set having remained 45 prediction modes. At this time, the selection mode may be composed of 16 sets, the initial prediction mode may be configured as a multiple of four, or an arbitrary offset or the like may be applied to the initial multiple of four. The non-selection mode can be composed of the Non-Selection Mode Set by the encoder and the prediction modes that do not overlap with the prediction mode included in the MPM List and the selection mode set in a predetermined manner.

At this time, the decoding method of the intra prediction in the selection mode can perform decoding for the current block through the decoded prediction mode by decoding the selected mode flag(Selected mode flag==true) received from the encoder through the 4-bit fixed-length code and the prediction mode selected from the Selected Mode Set.

The decoding method of the intra prediction in non-selection mode can be performed when the value of the selection mode flag is 0 or false, One prediction mode can be decoded from the Non-Selection Mode Set to decode the current block by decoding a truncated binary code transmitted from the encoder.

As one embodiment of the decoding method according to the selection mode and the non-selection mode, 61 prediction modes not included in the MPM List include a selection mode set having 16 prediction modes and a remaining 45 prediction modes, It can be configured as a Non-Selected Modes Set. At this time, the selection mode may be composed of 16 sets, The initial prediction mode may be configured as a multiple of four, An arbitrary offset or the like may be applied to the initial multiple of four. The non-selection mode can constitute a non-selection mode set by the encoder and the prediction modes that do not overlap with the prediction mode included in the MPM List and the selection mode set in a predetermined manner.

Figure 22:
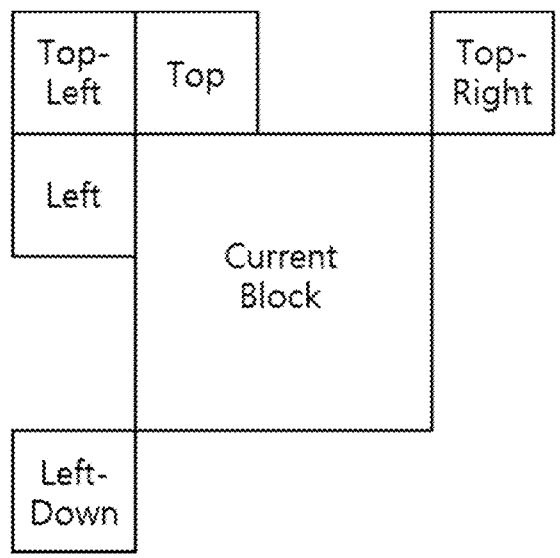
FIGS. 22 to 24 are reference diagrams for explaining a method of configuring an MPM mode from neighboring blocks according to an embodiment of the present invention.
Figure 23:
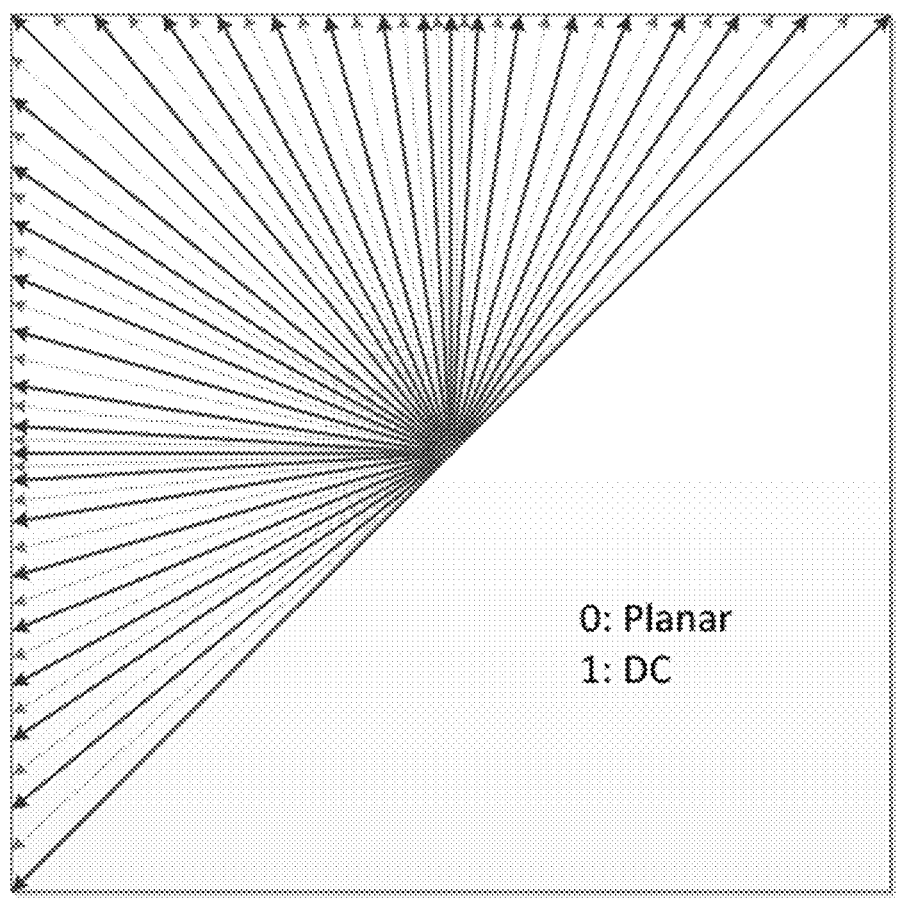
Figure 24:
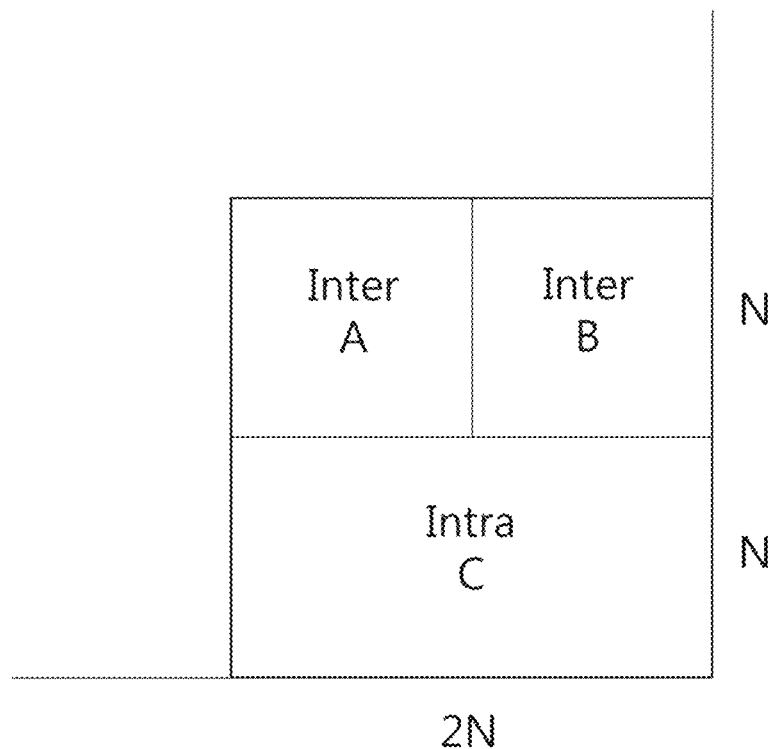

FIGS. 22 to 24 are reference diagrams for explaining a method of configuring the MPM mode from the neighboring block according to an embodiment of the present invention.

Referring to FIG. 22, in accordance with an embodiment of the present invention, the decoding device 20 configures six MPM list including the predictor of the angular mode from at least five neighboring blocks of the current block.

For example, as shown in FIG. 22, if the neighboring blocks are intra-coded, the image encoding apparatus 10 selects a block as part of the MPM list candidate when the top block located at the top side from the current block, the top left and top right blocks located on the top side of the current block can be referred to, and whether or not to put the block in the MPM list can be determined according to the coding efficiency.

In addition, when the left and left down blocks located on the left side of the current block can be referred to, the image encoding apparatus 10 can be determined whether to insert in the MPM list according to the coding efficiency after selecting these as some of the MPM list candidates.

As described above, as shown in FIG. 9, if the neighboring blocks are encoded in a square and rectangular structure, The block may be divided into at least one more blocks in the left side or right side so as to have one or more upper block candidates or left block candidates. In this case, up to seven intra-picture prediction block candidates can be derived in the MPM List.

FIG. 23 is a diagram illustrating the angular mode for 67 intra predictions, it can be represented that 0: Planar/1: DC mode. Thereafter, 65 prediction modes (Angular mode) may exist depending on the direction. In this specification, the direction toward the down left end may be diagonal_2, diagonal_65 is the direction toward the top right corner.

Then, the image encoding apparatus 10 and the decoding device 20 determines the mode according to the first method and the second method to be described later to fill at least six MPM lists from five neighboring blocks in a sub-decoding process based on the MPM prediction mode, when there is no mode to determine from the neighboring block anymore. The list can be configured according to the third method. At this time, in the case of Planar and DC, although the prediction mode may not be derived from the neighboring blocks, and the list can be determined by the first method.

First Method: When the neighboring block is intra-coded, the image encoding apparatus (10) configures the MPM list by adding the prediction mode (Angular mode) and the DC/Planar mode of the reference blocks that do not overlap with each other to the list by setting the neighboring block is set as a reference block.

Second Method: When fails to fill all six MPM lists through the first method, the image encoding apparatus 10 it is added to the list the prediction mode calculated from variable values (sum or difference value, @=1, 2, 3, . . . etc.) from the existing filled mode. If the six MPM lists are still not filled, if there is no DC or Planar mode, the image encoding apparatus 10 adds the Planar and DC modes to the list within the MPM list due to the overlapping prediction mode (Angular mode).

Third method: When the six MPM lists may not be configures through the second and third methods, and configures 6 MPM list based on Vertical/Horizontal/Diagonal_2 (from Left-Down towards Right-Top Conner)/Diagonal_65 (from Right-Top towards Left-Down Conner). By the first method, Planar and DC are already in the list.

FIG. 24 is an embodiment when intra C in the quad-tree block partition structure according to the embodiment of the present invention is coded in the MPM mode.

In the case of an existing quad-tree block partition, there may not be a partitioned prediction unit PU in one coding unit CU, as coded into the intra block, only 4 blocks of N×N or 2N×2N block partitions were possible.

However, according to the embodiment of the present invention, in consideration of the quad-tree block partition capable of the above-described binary tree, when the unit for determining the prediction unit and the coding unit is the same size in the terminal node, the partitioning as shown in FIG. 24 becomes possible. Accordingly, it is impossible to refer to the intra prediction direction in all five surrounding blocks as in the conventional art. In this case, methods for configuring the MPM list as described above can be proposed.

In the case of FIG. 24, the image encoding apparatus 10 may configure Planar mode and DC mode for intra C through the above-described first method as MPM list. Since the image encoding apparatus 10 does not have a prediction mode (an angular mode) to be referred to, the second method can be skipped. Then, the image encoding apparatus 10 configures the remaining MPM list in the order of vertical/horizontal and two diagonal directions using the third method, thereby configuring six MPM lists. Nevertheless, if the MPM List is not filled in its own prediction direction. As described above, a prediction mode calculated from a variable value (addition value or difference value, @=1, 2, 3, . . . etc.) from the previously filled mode can be added to the MPM list.

Figure 25:
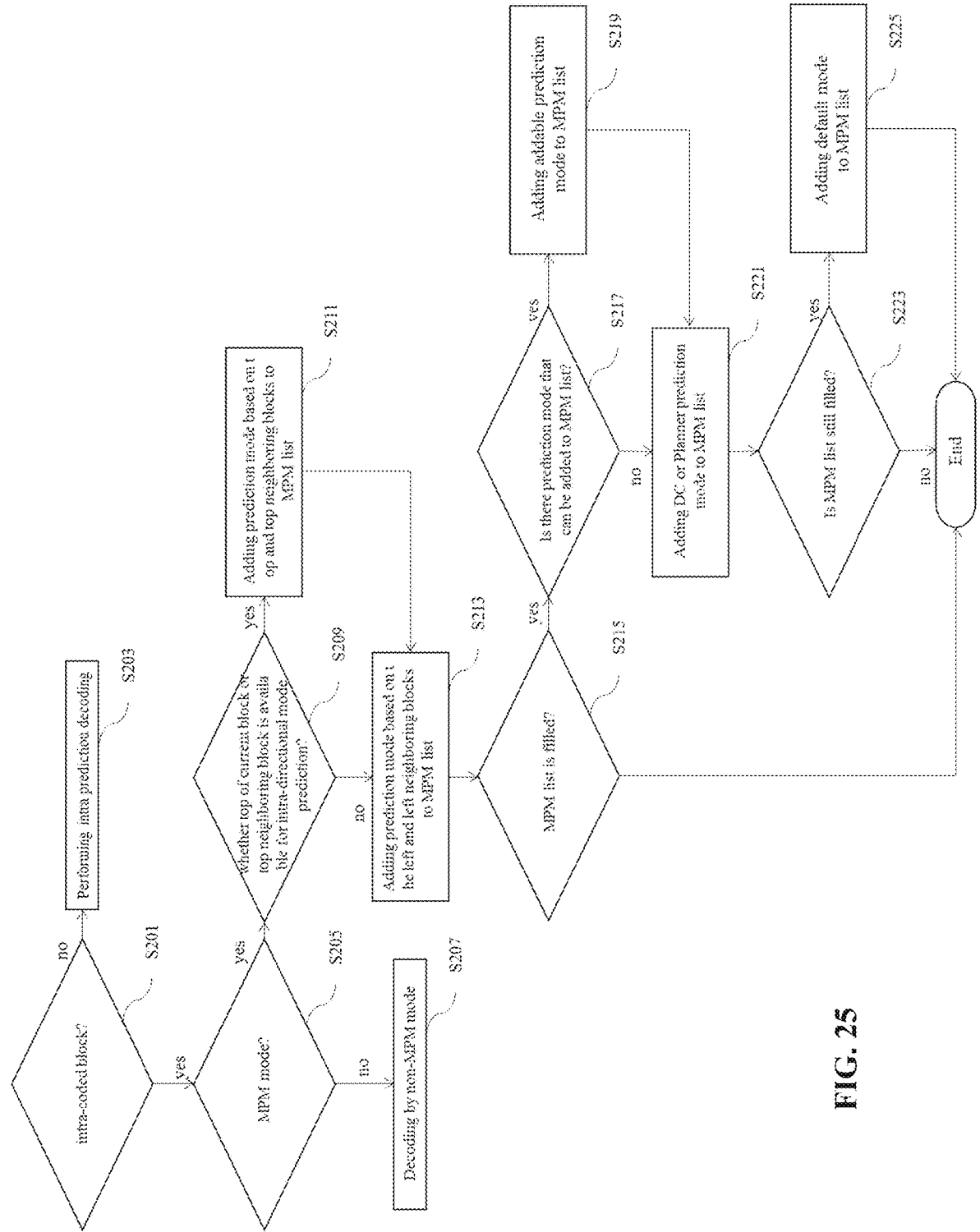
FIG. 25 is a flowchart illustrating a method of configuring an MPM list according to an embodiment of the present invention.

FIG. 25 is a flowchart illustrating a method of configuring the MPM list according to an embodiment of the present invention.

As described above with reference to FIGS. 22 to 24, the decoding device 20 according to the embodiment of the present invention can sequentially configure the MPM list for the MPM mode through the intra prediction unit 230 using the first to third methods. Hereinafter, the list configuration method will be described step by step.

First, the decoding device 20 determines whether the current block is an intra-coded block (S201) If not, intra prediction decoding is performed (S203).

In the case of the intra-coding block, the decoding device 20 determines whether it is the MPM mode based on the MPM flag (S205).

If it is not the MPM mode, the decoding device 20 decodes the non-MPM mode (S207). This will be described later in more detail.

On the other hand, in the MPM mode, the decoding device 20 determines whether the top of the current block or top neighboring block is available for the intra-directional mode prediction (S209).

And, if available, the decoding device 20 adds the prediction mode based on the top and top neighboring blocks to the MPM list (S211).

If not available, the decoding device 20 determines again whether the left and right neighboring blocks are available, if possible, the decoding device adds the prediction mode based on the left and left neighboring blocks to the MPM list (S213).

Then, the decoding device 20 determines whether the MPM list is filled (S215).

If it is not filled, the decoding device 20 determines whether there is the prediction mode that can be added to the MPM list (S217) and an addable prediction mode can be added to the MPM list (S219).

If not, the decoding device 20 may add the DC or Planner prediction mode to the MPM list, respectively (S221).

After that, the decoding device 20 can determine whether the MPM list is still filled (S223). If it is not filled, the decoding device adds to the MPM list using the default mode (S225).

Here, there may be a plurality of Default Mode Sets composed of arbitrary prediction mode sets according to coding efficiency and standard in the basic mode. At this time, if Default Mode Set is selected to fill the MPM List, one of a plurality of Default Mode Sets may be selected according to the structure and characteristics of the block, or may be selected through a separate signaling signal, thereby configuring an MPM List.

On the other hand, when the MPM list is filled, that is, for example, when the number of MPM lists is six, the decoding device 20 closes the MPM list configuration and parses the MPM index information therefrom to perform decoding operation according to the intra prediction mode of the current block.

Figure 26:
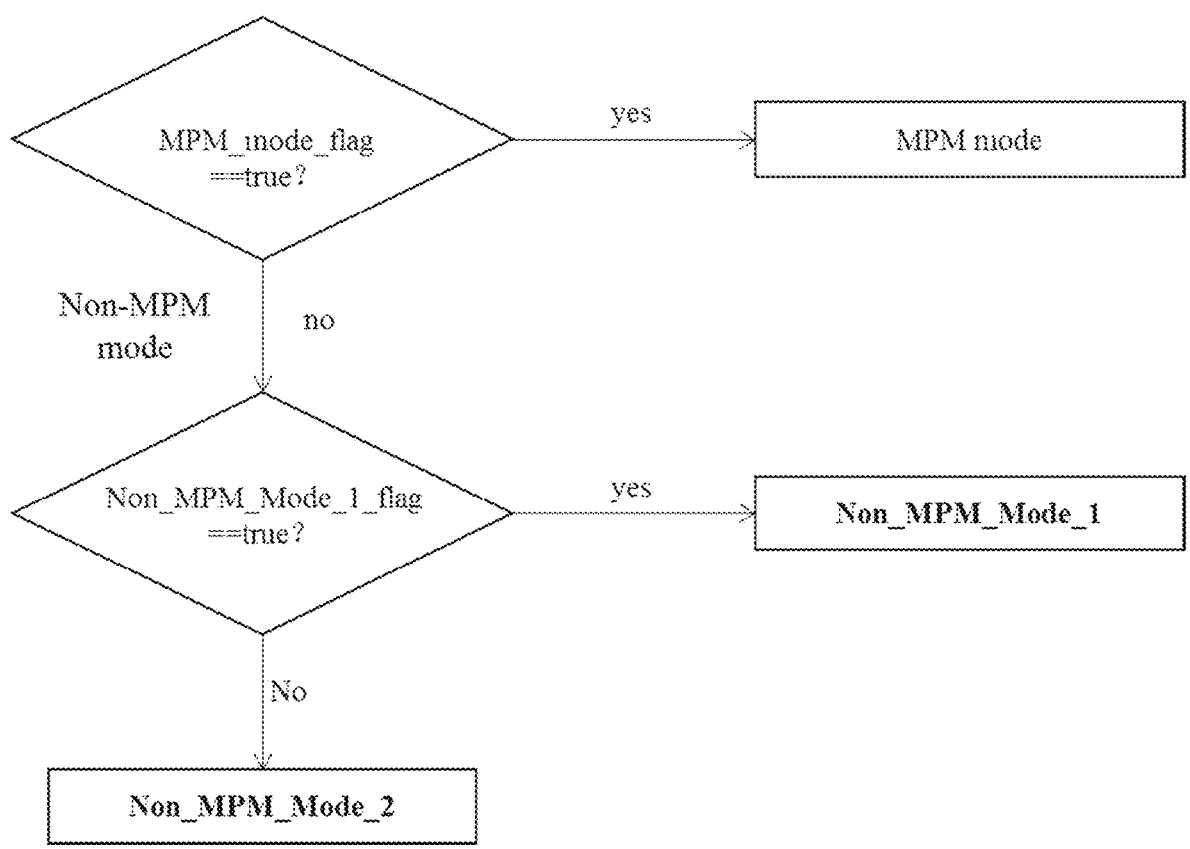
FIGS. 26 and 27 are flowcharts for explaining a method of decoding an intra prediction mode in the case of not an MPM mode according to an embodiment of the present invention.
Figure 27:
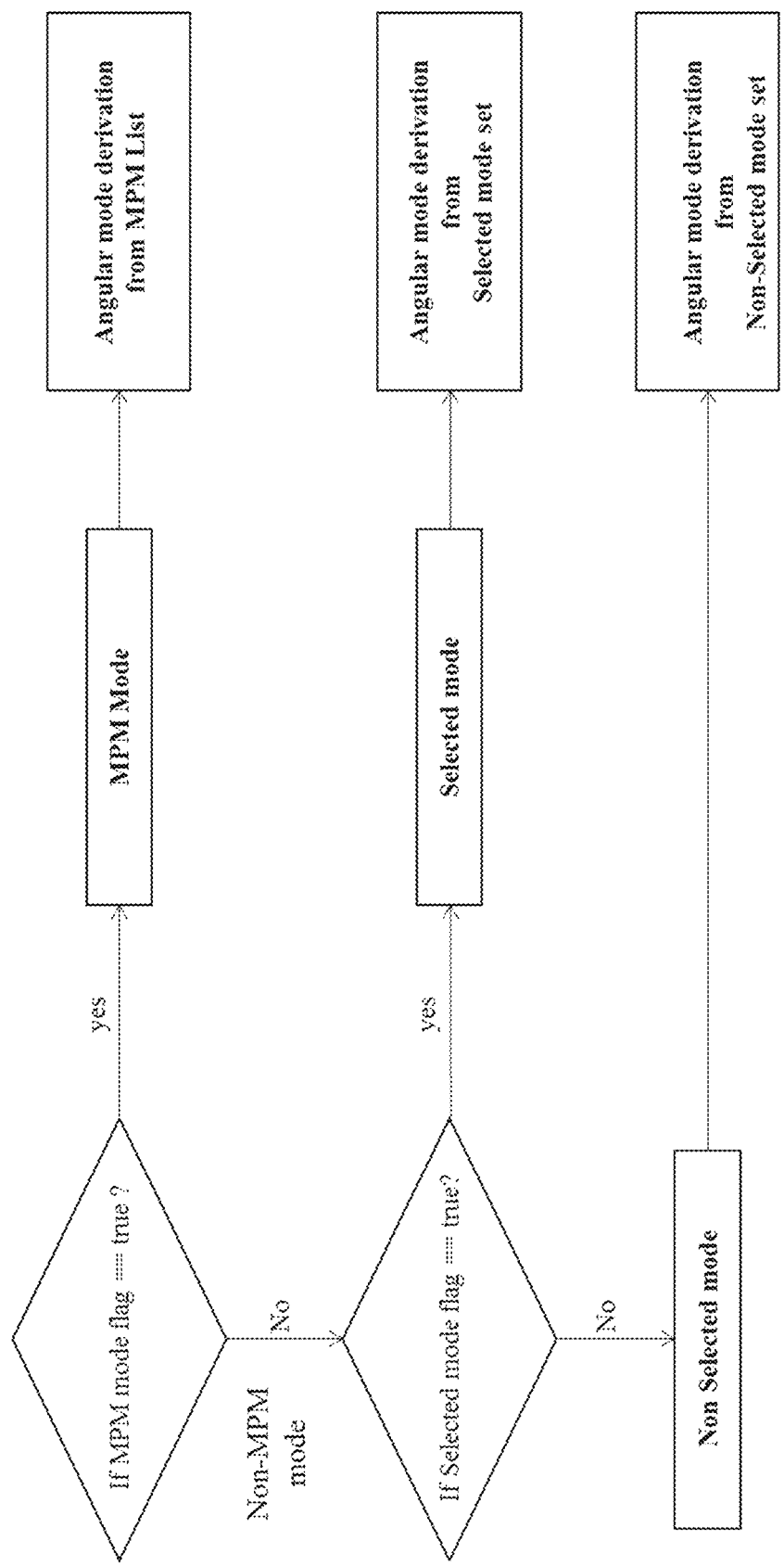

FIGS. 26 and 27 are flowcharts for explaining a method of decoding the intra prediction mode in the case of not an MPM mode according to an embodiment of the present invention.

Referring to FIG. 26, first, the decoding device 20 can determine a plurality of non-MPM modes depending on whether the MPM mode or not. The plurality of non-MPM modes may be any one of preset modes (Non_MPM_mode_1, Non_MPM_mode_2, . . . ) and can be determined according to each flag. Here, Non_MPM_mode_1 or Non_MPM_mode_2 may be renamed according to a coding standard or the like. As an example of this, Non_MPM_mode_1 may be performed in Selected mode and Non_MPM_mode_2 may be performed in Non-selected mode to perform the intra picture prediction encoding and decoding, as in the encoding and decoding method of FIG. 21.

As shown in FIG. 27, the decoding device 20 enters the respective prediction modes (MPM, selection mode, non-selection mode) according to whether or not the MPM mode flag and the selection mode flag are True and the prediction mode can be derived from the MPM list, the selection mode set, or the non-selection mode set.

First, the decoding device 20 parses the MPM mode flag described above to confirm the MPM mode.

In the MPM mode, the decoding device 20 can perform decoding operation in the MPM mode. As described above, in the MPM mode, the decoding operation can be processed through 67 intra prediction modes. Here, 65 angular modes and DC/Planar modes are included in the MPM mode.

On the other hand, when not encoded in the MPM mode, the decoding device 20 may process in a non-MPM mode. Here, the selection mode and the non-selection mode for decoding into one of the 61 intra modes not included in the MPM mode can be applied.

At this time, when fixed length coding is performed as an existing method, since it takes 6 bits in total. The decoding device 20 classifies the remaining 61 intra modes into a plurality of non-MPM modes, the non-MPM mode set can be configured according to a certain algorithm for each kind of classified non-MPM mode.

If the current decoding block is coded in the non-MPM mode, the decoding device 20 decodes a syntax for selecting a type of the non-MPM mode, and the index of the selected non-MPM mode set to derive the prediction mode (Angular mode) of the decoding block. When the non-MPM mode block is encoded/decoded in this manner, a bit saving effect can be achieved according to the number of non-MPM modes to be classified and the rules that constitute each non-MPM mode set, thereby improving the coding efficiency.

In one embodiment, as shown in FIG. 26, the non-MPM mode can be classified into two. One of the non-MPM modes may be referred to as the selection mode and the prediction mode set(angular set) may be referred to as the selection mode set.

On the other hand, the other one may be referred the non-selection mode, and the angular set thereof can be called the non-selection mode set. At this time, the non-selection mode may be configured only in the angular mode not included in the selection mode set.

For example, if the selection mode set is configured with a multiple of four, the angular modes from 2 to 67, except Planar, DC mode, and the MPM List can be configured 16 sets such as Set A={0, 4, 8, 12, 16, . . . 60}, the decoding device 20 can select one of the indices for the selected angular mode in the encoding step.

On the other hand, the decoding device 20 decodes the angular mode can be decoded when the decoding block is selected as the selection mode in the non-MPM mode. In addition, since it can be decoded with 4bit Fixed length coding, the compression efficiency can be improved compared with the conventional method.

Then, the decoding device 20 sets the non-selected mode set to the set B={2, 3, 5, 6, 7, . . . 65, 66, 67}

And it can be decoded by a truncated binary coding method to improve the encoding and decoding efficiency.

Figure 28:
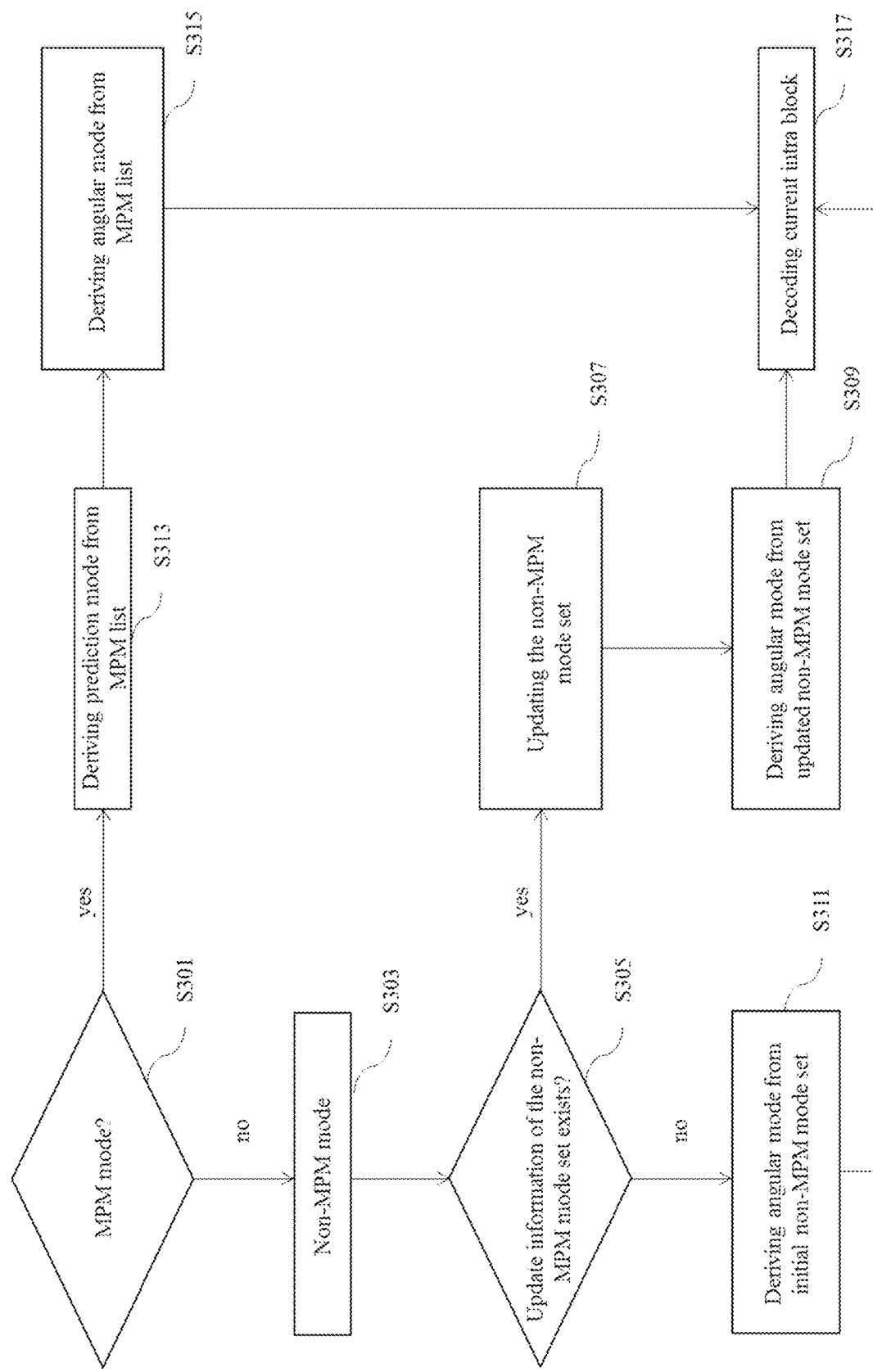
FIG. 28 is a flowchart illustrating an update-based decoding method of an MPM mode and a non-MPM mode according to an embodiment of the present invention.

FIG. 28 is a flowchart illustrating an update-based decoding method of the MPM mode and the non-MPM mode according to an embodiment of the present invention.

Referring to FIG. 28, in the block decoded in Non-MPM mode. It is possible to derive the intra angular mode through a plurality of non-MPM mode sets before receiving the update, and thereafter, the directional prediction mode of the decoded block can be derived by updating the default non-MPM mode set configuration.

Accordingly, the decoding device 20 first determines whether it is in the MPM mode (S301). In the case of the MPM mode, the prediction mode is derived from the MPM list (S315), if the MPM mode is not the MPM mode (S303), it is determined whether update information of the non-MPM mode set exists (S305).

For this purpose, the image encoding apparatus 10 may transmit non-MPM update information to be included in the slice header or the picture header. The non-MPM update information may include selected mode information among non-MPM modes or update information for a certain rule of the set configuration.

The decoding device 20 may derive the angular mode from the initial non-MPM mode set if there is no update (S311).

In this case, when the non-MPM mode is configured as two, the decoding device 20 configures one of the decoding modes into the selected mode, and the other is configured as the non-selected mode. Next, the initial non-MPM set can be configured as an inclusive set of the selected mode including modes that are not included in the multiples of 4, or non-selected mode that are not included in the selected mode.

If the update information is included, the decoding device 20 can update the information of the selected mode set and the non-MPM mode set (S307). The angular mode can be derived from the updated non-MPM mode set.

For example, the decoding device 20 configures a default mode set, and a plurality of non-MPM mode sets are updated by obtaining the additional information corresponding to a plurality of default mode sets in the non-MPM mode from the picture header, the slice header, or the tile header, or the change value corresponding to the previously designated set.

Here, when the neighboring blocks are coded in different prediction modes, there may be a possibility that the compression efficiency drops when the MPM list is filled with the default value of MPM mode. Accordingly, the image encoding apparatus 10 efficiently derive the angular of non-MPM mode by transmitting the index of a default set for selecting a part of a default set of the non-MPM mode, and the additional angular mode of the directional prediction mode (an angular mode) corresponding to the index is transmitted as a difference signal value.

For example, if the default mode set is configured as Default mode set={2, 18, 34, 50, 60}, the image encoding apparatus 10 can transmit only the difference signal {1, 0, 3, 2, 2} corresponding to the index. Accordingly, the decoding device 20 may receive the difference signal to obtain the updated mode set {3, 18, 37, 52, 62} after the default mode set is configured.

Also, in using a plurality of mode lists for the non-MPM Mode, the decoding device 20 can update the current GOP using the non-MPM Mode selected earlier than a certain frequency in the previous GOP in accordance with the GOP unit. Then, the decoding device 20 can decode the current intra block is decoded (S317) based on the prediction mode selected through S311, S309 or S315.

The method according to the present invention may be implemented as a program for execution on a computer and stored in a computer-readable recording medium. Examples of the computer-readable recording medium include a ROM, a RAM, a CD, a floppy disk, an optical data storage device, and the like, and may also be implemented in the form of a carrier wave (for example, transmission over the Internet).

The computer-readable recording medium may be distributed over a networked computer system so that computer readable code can be stored and executed in a distributed manner. And, functional programs, codes, and code segments for implementing the above method can be easily inferred by programmers of the technical field to which the present invention belongs.

While the present invention has been particularly shown and described with reference to exemplary embodiments thereof, it is to be understood that the invention is not limited to the disclosed exemplary embodiments, but, on the contrary. It will be understood by those skilled in the art that various changes and modifications may be made without departing from the spirit and scope of the present invention.

What is claimed is:

1. An image processing method comprising:
receiving an encoded bit stream;
performing inverse quantization and inverse transform on the received bit stream and obtaining a residual block;
obtaining a prediction block by performing an inter prediction or an intra prediction;
reconstructing an image by summing the obtained residual block and the prediction block; and
performing adaptive loop filtering by each coding tree unit for the reconstructed image,
wherein a coding unit, which is a basic unit in which the inter prediction or the intra prediction is performed, is a block divided from a coding tree unit using a binary tree structure, and
a prediction mode list for deriving a prediction direction of a decoding target block from an intra prediction direction of a neighboring block adjacent to the decoding target block is selectively configured for an intra predicted unit of the divided coding units in the step of obtaining the prediction block.

* * * * *